(12) United States Patent
Sulc et al.

(10) Patent No.: US 11,789,281 B2
(45) Date of Patent: Oct. 17, 2023

(54) OPTICAL SYSTEM FOR PRODUCING A STRUCTURED BEAM

(71) Applicants: CERN, Geneva (CH); Ustav fyziky plazmatu AV CR, v.v.i, Prague (CZ)

(72) Inventors: Miroslav Sulc, Prague (CZ); Jean-Christophe Gayde, Geneva (CH)

(73) Assignees: CERN, Geneva (CH); USTAV FYZIKY PLAZMATU AV CR, V.V.I, Prague (CZ)

(*) Notice: Subject to any disclaimer, the term of this patent is extended or adjusted under 35 U.S.C. 154(b) by 0 days.

(21) Appl. No.: 17/052,042

(22) PCT Filed: May 2, 2019

(86) PCT No.: PCT/EP2019/061279
§ 371 (c)(1),
(2) Date: Oct. 30, 2020

(87) PCT Pub. No.: WO2019/211391
PCT Pub. Date: Nov. 7, 2019

(65) Prior Publication Data
US 2021/0191134 A1 Jun. 24, 2021

(30) Foreign Application Priority Data
May 2, 2018 (EP) ..................................... 18305552

(51) Int. Cl.
*G01B 11/26* (2006.01)
*G02B 27/09* (2006.01)
(52) U.S. Cl.
CPC .......... *G02B 27/0927* (2013.01); *G01B 11/26* (2013.01); *G02B 27/0966* (2013.01)

(58) Field of Classification Search
CPC ............ G02B 27/0927; G02B 27/0966; G02B 27/286; G02B 27/0955; G02B 5/001; G02B 5/3083; G01B 11/26; B23K 26/073
(Continued)

(56) References Cited

U.S. PATENT DOCUMENTS 4,400,063 A * 8/1983 Hayashida ......... G02B 27/0025
359/206.1
5,198,867 A * 3/1993 Campbell ............ G01B 11/255
356/127

(Continued)

OTHER PUBLICATIONS

A compact Airy beam light sheet microscope with a tilted cylindrical lens, Biomedical Optics Express, vol. 5, No. 10, Sep. 5, 2014 (Sep. 5, 2014), p. 3434, XP055335519, United States ISSN: 2156-7085, DOI: 10.1364/BOE.5.003434, (Year: 2014).*

(Continued)

*Primary Examiner* — Isiaka O Akanbi
(74) *Attorney, Agent, or Firm* — Erise IP, P.A.

(57) ABSTRACT

An optical system for producing a structured optical beam including a convex lens having a spherical or cylindrical entry surface, an electromagnetic radiation source configured to provide a substantially coherent beam of electromagnetic radiation, and a focusing element arranged along the optical axis of the optical system. The electromagnetic radiation source is arranged to produce an illuminating beam which illuminates the convex lens over a selected illumination fraction of the spherical or cylindrical entry surface and with a corresponding selected focus of the illuminating beam such that the beam traverses a sufficient refractive volume of the convex lens to produce aberrations in the beam emerging from the convex lens such that it comprises a structured optical beam. The system and method allows for (Continued)

generating a structured beam which can propagate over the large distances while maintaining a well-defined cross-section intensity distribution.

21 Claims, 16 Drawing Sheets

(58) Field of Classification Search
USPC .... 356/124, 517, 481, 504, 361, 515, 239.2, 356/400
See application file for complete search history.

(56) References Cited

U.S. PATENT DOCUMENTS

| | | | | |
|---|---|---|---|---|
| 5,223,983 | A * | 6/1993 | Oono | G11B 7/1356 |
| | | | | 359/638 |
| 10,634,485 | B2 * | 4/2020 | Gross | G02B 13/18 |
| 2005/0078383 | A1 * | 4/2005 | Jones | G02B 6/4206 |
| | | | | 359/717 |
| 2006/0119949 | A1 * | 6/2006 | Tanaka | H01L 21/02691 |
| | | | | 359/624 |
| 2008/0239278 | A1 * | 10/2008 | Altendorf | G01B 11/026 |
| | | | | 356/3 |
| 2013/0021226 | A1 * | 1/2013 | Bell | G02B 3/0006 |
| | | | | 345/8 |
| 2017/0052381 | A1 * | 2/2017 | Huang | G02B 27/0955 |
| 2017/0368638 | A1 | 12/2017 | Tayebati et al. | |
| 2019/0064444 | A1 * | 2/2019 | Jones | G02B 6/264 |
| 2019/0137734 | A1 * | 5/2019 | Gong | G02B 13/14 |

OTHER PUBLICATIONS

European Patent Application No. 18305552.4 Search Report dated Oct. 18, 2019.
European Patent Application No. 18305552.4 Examination Report dated Jun. 17, 2021.
International Search Report and Written Opinion; Application No. PCT/EP2019/061279; Applicant: CERN; dated Jun. 1, 2019.
Zhengyi Yang, et al.; "A Compact Airy Beam Light Sheet Microscope with a Tilted Cylindrical Lens", Biomedical Optics Express, vol. 5, No. 10; dated Sep. 5, 2014.
Chunjie Zhai, et al.; "Gouy Phase Shift of Lens-Generated Quasi-Nondiffractive Beam", Optics Communications, vol. 396; dated Mar. 22, 2017.
Devilez, A, et al.; "Photonic Jets and Bessel Beams," SPIE vol. 7786, dated Aug. 19, 2010.

* cited by examiner

OPTICAL SYSTEM FOR PRODUCING A STRUCTURED BEAM

RELATED APPLICATIONS

The present application is a national stage application under 35 U.S.C. § 371 of International Application No. PCT/EP2019/061279, filed 2 May 2019, which claims priority to European Patent Application No. 18305552.4, filed 2 May 2018. The above referenced applications are hereby incorporated by reference in their entirety.

TECHNICAL FIELD

The present invention relates to a system and method for producing a structured optical beam, in particular, an optical system for generating a structured beam with low divergence which can be sustained over large distances.

BACKGROUND

Structured beams (SBs), sometimes called non-diffractive beams (NDBs), were discovered in 1987 (J. Durnin, J. J. Miceli, and J. H. Eberly, Phys. Rev. Lett. 58, 1499, 1987). The light intensity distribution on the cross-section plane of such beams can be mathematically described by a Bessel, Airy or similar mathematical functions, so the beams are often called Bessel or Airy beams. This intensity distribution differs from the smoothly varying Gaussian distribution of a laser beam and can result in a fine structure with dimensions less than the wavelength of the radiation, resulting in a number of useful properties.

In general, structured beams are generated by the superposition of monochromatic waves with small fixed phase shifts, propagated at a narrow angle. From Heisenberg's uncertainty principle of quantum physics, the resulting intensity distribution contains areas of a stationary electromagnetic field with longitudinal polarisation. The generated structured beam is a combination of these stationary fields and areas of propagating waves.

Structured beams are of particular interest due to their non-diffractive properties which mean that, unlike Gaussian beams, they have a reduced divergence, allowing them potentially to propagate over large distances and maintain a well-defined small spot size. Conventional Gaussian beams are diffractive which means that they are also diverging, leading to a transverse spread in the intensity distribution as the beam propagates. A typical divergence for a normal 10 mW He—Ne laser is 1 mrad such that, with a starting diameter (waist) of 1 mm, the beam diameter will be 11 mm after propagating for 10 m, with a corresponding reduction in intensity.

The increase in size of the beam spot and the reduction in intensity mean it is more difficult to aim the beam precisely on a target or detector at a long distance. It is possible to decrease the divergence by using a beam expander and collimator, but the consequence is that the beam becomes larger and measurements of high precision often become difficult or impossible.

Diffraction is a general physical phenomenon based on Heisenberg's uncertainty principle of quantum physics. Diffraction phenomena will not allow observation, illumination and manipulation of objects smaller than the wavelength of light. However since structured beams can contain fine structures in the intensity distribution at a scale smaller than the wavelength of light, they are able to overcome this.

The potential to achieve beams with low divergence and small spot size makes structured beams of particular interest for use in a wide range of applications including alignment techniques, angle and distance measurement, interferometry, communication and optical tweezers.

Since their discovery in 1987, a number of different approaches have been used to generate structured beams. The first structured beams were produced by illumination of a narrow annular slot wherein the light from the annulus was concentrated by a lens. Since then, various systems for generating structured beams have been developed which utilise illumination of annular apertures, axicons, fibres, holograms, zonal plates and phase modulators. The most useful known methods and systems use axicon lenses which incorporate one conical and one planar surface. Such conical lenses are used to create an approximation of a non-diffractive Bessel beam from a collimated Gaussian beam in the near field.

However all of these systems have only been shown to generate structured Bessel-like beams over limited ranges, typically up to one meter. This precludes their use in measurement technologies which require measurements over greater distances, at high precision or alignment of components in a large scale system.

Furthermore, the beams generated by known systems are generally not of sufficient quality to achieve high precision in such applications. In particular, the cross-section of the beam does not maintain the structured intensity distribution over a significant distance. That is, the Bessel-like structure of beams generated by known systems lacks a well-defined intensity distribution showing clear continuous edges and having a high contrast between light and no-light areas at larger distances. This has implications for the divergence of the beam and the ability to maintain a small spot size over large distances.

These issues in the quality of the structured beams produced by known methods reduce their efficacy for use in various measurement technologies where the greater divergence and greater spot size limits the detection capability and/or precision with which measurements can be made and the range over which they can be used.

Furthermore, the known methods described above produce fixed-shape structured beams or often require complex optical systems with numerous components which must be accurately arranged and configured in order to generate the structured beam of required properties. Another related issue is that it is not straightforward to adjust such systems to vary the beam parameters such that no one optical system may be adjustable to alter the beam properties for use in a variety of applications.

In view of the above described limitations for Gaussian beams and issues with the known systems for producing structured beams, there exists a need for a system and method which makes progress in overcoming these problems.

SUMMARY OF THE INVENTION

The present invention seeks to provide an optical system and method for generating a structured beam which has the potential to propagate over large distances while maintaining a well-defined cross-sectional intensity distribution such that a low divergence and small central spot size and defined structure may be maintained over large distances. The present invention further aims to provide a low cost, simple to arrange and adjustable system for producing a structured beam in which the parameters may be varied such that it may be applied in a number of different measurement technologies.

According to a first aspect of the invention, there is provided an optical system for producing a structured optical beam, the optical system comprising: a convex lens having a spherical or cylindrical entry surface, the convex lens comprising a material having a refractive index of at least 1.8; an electromagnetic radiation source configured to provide a substantially coherent beam of electromagnetic radiation; and a focusing element arranged along the optical axis of the optical system; wherein the electromagnetic radiation source is arranged (i.e. configured) to produce an illuminating beam (i.e. using the substantially coherent beam) which illuminates the convex lens over a selected illumination fraction of the spherical or cylindrical entry surface and with a corresponding selected focus of the illuminating beam such that the beam traverses a sufficient refractive volume of the convex lens to produce aberrations in the beam emerging from the convex lens such that it comprises a structured optical beam.

The combination of the convex lens and focusing element (also referred to as "the lens system") generates the structured optical beam when illuminated by the illuminating beam so that a structured optical beam emerges from the optical system.

In other words, the electromagnetic radiation source and the lens system are arranged such that the electromagnetic radiation source provides a substantially (at least partially) coherent illuminating beam which illuminates the lens system to provide a selected illumination fraction of the spherical or cylindrical entry surface of the convex lens and a corresponding selected focus of the illuminating beam such that the beam traverses a sufficient refractive volume of the convex lens to produce aberrations in the beam emerging from the lens system resulting in the formation of a structured optical beam.

In particular, by passing the illuminating beam through the lens system, a long distance structured optical beam with low divergence (i.e. a "non-diffractive beam" or "an approximate Bessel-beam") is generated. The combination of spherical aberrations provided by the sufficient refractive volume of the convex lens and defocus provided by the focusing element and convex lens lead to the formation of the structured optical beam when illuminated by the illuminating beam produced by the source.

The focusing element may be arranged between the electromagnetic radiation source and the convex lens (i.e. the focusing element may be positioned between the electromagnetic radiation source and the convex lens in the path of the electromagnetic radiation through the system) such that the focusing element focusses the illuminating beam onto the convex lens to provide the selected illumination fraction of the entry surface and the corresponding selected focus such that the beam traverses a sufficient refractive volume of the convex lens to produce the required aberrations in the beam emerging from the convex lens resulting in the formation of a structured optical beam, in particular a long distance structured optical beam or non-diffractive beam.

Alternatively the convex lens is arranged between the electromagnetic radiation source and the focusing element (i.e. the convex lens is positioned between the electromagnetic radiation source and the convex lens in the path of the electromagnetic radiation through the system) such that the focusing element focusses the beam emerging from convex lens; and the source is arranged (i.e. configured) to provide illumination of the convex lens over the selected illumination fraction of the entry surface such that the beam traverses a sufficient refractive volume of the convex lens to produce the required aberrations in the beam emerging from the convex lens resulting in the formation of a structured optical beam when the beam emerging from the convex lens is focused by the focusing element, In particular a long distance structured optical beam or non-diffractive beam is formed when the structured beam emerging from the convex lens is focused along the optical axis by the focusing element.

Preferably in this arrangement the electromagnetic radiation source is arranged to provide substantially parallel illumination, i.e. an illuminating beam which is substantially parallel.

In this arrangement, the beam emerging from the convex lens may be considered a structured beam as it exhibits aspects of the structure described below. However focusing the beam emerging from the convex lens with the focusing element generates a long distance structured beam or non-diffractive optical beam.

With the optical system according to the present invention, a high quality structured beam may be produced which can be sustained for large distances while maintaining a well-defined structure of the cross-sectional intensity distribution.

In particular, due to the refractive properties of the spherical or cylindrical entry surface of the high refractive index lens, the different radial segments of the incoming beam incident on the lens follow different paths with different phase delays when propagating through the lens. In particular, rays at varying distances from the optical axis travel through differing volumes of refractive material and therefore experience differing refractive effects. When the rays emerge from the lens, the resulting superposition of waves creates a field emerging from the convex lens which may have a fine structure with dimensions smaller than one wavelength at the waist. By first focusing the illuminating beam onto the convex lens with the focusing element or alternatively focusing the structured beam emerging from the convex lens with the focusing element, the structured beam emerging from the optical system can be propagated over large distances with very little divergence.

Due to the superposition of neighbouring waves, with the relative phase shift smaller than $\pi/4$, focused by the optical system to a space with the axial (longitudinal) length of the order of some wavelengths, the diffraction limit, given by the Heisenberg uncertainty principle, may be overcome. The optical system has the effect of changing the transversal polarization of the incoming beam to longitudinal polarization in coaxial cones in a small interference field in some parts of the outgoing beam. The areas with longitudinal field are stationary electromagnetic fields created by passing waves. The full field looks like alternations of light cones with transversal polarization and dark cones with longitudinal polarization. These cones have very low divergence and correspond to light and dark rings at the beam cross-section.

Therefore, unlike conventional Gaussian beams, where diffraction phenomena will not allow observation, illumination and manipulation of objects smaller than the wavelength of the beam, the structured beam generated by the present invention is able to overcome this.

Advantageously, the slightly curved shape of the wavefront emerging from the convex lens results in a superposition of waves corresponding to rays of a range of angles. The rays emerging from the optical system converge toward different points giving a continuous convergence along the optical axis, an effect which may be utilised to allow a structured beam to propagate over a much increased distance. This makes progress over known systems, for example those that incorporate an axicon, where the lens is limited to one angle which means the length of the axicon-generated structured beam is limited accordingly.

These properties make the beam useful in a wide range of applications such as distance measurement and positioning where being able to maintain a non-diffracting beam with a small spot size over long distances allows for remote measurements to be made to a high precision.

Furthermore, there are very few constituent elements required in comparison to some of the known systems, namely only the convex lens with a spherical or cylindrical entry surface and a refractive index of at least 1.8 together with a focusing element, appropriately illuminated by a source of coherent electromagnetic radiation. The system is therefore much less complex and costly than most prior art systems for generating structured beams. The parameters of the system may also be easily adjusted in order to modify the focus, the divergence of the beam and of the central beam as well as the number and thickness of rings, as will be described in detail below.

The expression "structured optical beam" is used to refer to a beam in which the distribution of intensity in the radial cross-section may be approximated by a Bessel-function of the first kind or a similar function. Structured optical beams can be converged to almost parallel coaxial cones as a long-distance structured beams, often described as "non-diffracting" beams, as beams with intensity distribution described by a Bessel function are not subject to transverse spreading (diffraction) as they propagate. True Bessel-beams are not possible to achieve in practice as the radial intensity profile extends to infinity such that they require infinite energy. However close approximations of such beams, i.e. approximate Bessel-beams (which may be referred to simply as "Bessel-beams" herein), may be formed which display diffractive characteristics approaching those of true Bessel beams.

The expression "structured optical beam" or "structured beam" is therefore used to define such approximations to true non-diffractive beams. The structured beam generated by the invented system is closer to a true non-diffractive than any known system, but is still imperfect and it will still diverge over large distances. However, since it overcomes the diffraction limit, it can be said to be non-diffractive.

The term "structured optical beam" encompasses both the beam emerging from an optical system as described above (including a convex lens and a focusing element) and also the beam emerging from such a system when no additional focusing element is used, i.e. solely incorporating the source and convex lens. In the latter case the beam emerging from the convex lens still exhibits structure in distribution of intensity in the radial cross-section which may be approximated by a Bessel-function of the first kind or a similar function. However when the focusing element is incorporated, the beam is propagated along the optical axis to much greater distances and exhibits much less divergence and therefore such beams are referred to as "long-distance structured optical beams" or "non-diffractive beams".

The intensity profile of the generated structured beam comprises a bright central beam and a series of concentric rings. The reduced divergence, or "low divergence" described herein refers to the fact that the divergence of the bright central beam of the generated structured beam (i.e. the bright central spot in the cross-sectional intensity profile) is less than the divergence of corresponding Gaussian beam, the latter being limited by the diffraction limit. The concentric rings may diverge but axial central beam has a much reduced divergence relative to Gaussian beams.

"Secondary structured beams" are beams produced by focusing a part of a structured beam, for example by placing a focusing element with a focus distanced away from the system generating the primary structure beam.

In optics, the term coherent is used to describe the theoretical situation in which waves which have a constant phase difference and the same frequency. Here, "substantially coherent" refers to the fact that the incident radiation approaches this ideal to the extent that any effects due to variation in frequency or phase difference do not have a significant effect on the properties of the structured beam. In practice, it has been proven that high quality structured beams can be achieved even if the beam is only partially coherent and therefore beams which are at least partially coherent meet the above definition. These conditions may simply be referred to as "coherent" in the following text—i.e. coherent enough that any variation in frequency or phase difference does prevent the formation of a structured optical beam. The optical system may generate a high quality non-diffractive beam even if the illuminating beam is at least partially coherent. In preferred embodiments, the relative phase shift between neighbouring waves must be less than $\pi/4$, where the neighbouring beams are not more than a wavelength away from each other.

The "illumination fraction" is the fraction of the spherical entry surface of the convex lens which is illuminated. This term provides a measure of the cross-sectional size of the beam relative to the size of the lens. The selected illumination fraction is expressed as a percentage (i.e. a fraction) of the radius of the transverse cross-section of the spherical or cylindrical entry surface provided by the radius of the transverse cross-section of the beam at the spherical or cylindrical entry surface. Preferably, the beam is aligned centrally on the lens such that it passes substantially symmetrically through the centre of the convex lens.

A spherical entry surface is intended to refer to a lens which is curved in two directions such that it has an entry surface defined by a partial sphere surface. A cylindrical entry surface is curved in one direction with the illuminating beam aligned substantially perpendicularly to the long axis of the cylinder.

Although much of the above and following discussion of the structured beam refers to the use of a convex lens with a spherical entry surface to produce a three-dimensional structured beam, all of this description applies equally to the use of convex lens with a cylindrical entry surface to produce a two dimensional structured beam. In the latter case a beam comprising (substantially) non-diverging parallel planes is produced, which is particularly useful for alignment purposes.

The "sufficient refractive volume of the convex lens" is that necessary to produce the required aberrations and depends on a number of interrelating parameters which must be appropriately selected to produce a structured beam. These parameters include the properties of the incoming electromagnetic radiation (i.e. wavelength, coherence, parallelism), and the properties of the refractive element (i.e. the shape and refractive index of the convex lens, and its size compared with the incoming beam). These interrelating parameters determine the refractive effect on the beam of the volume of the lens through which the beam traverses and must be selected to provide the required aberrations to produce the structure in the emerging beam. If one of the parameters is changed, it is possible to change others to compensate such that the beam still refracts to form the desired structure. The important requirement, for a lens of given refractive index and a beam of given wavelength, is that the focus and illumination fraction are selected such that a sufficient volume of the convex lens is traversed by the beam. The "refractive volume" is therefore simply the lens volume traversed by the beam.

The amount of refractive volume required also depends on the refractive index, with a greater refractive volume required to be traversed by the beam if the lens is of lower refractive index. For the case of parallel illumination, a glass ball with index 1.99 would need a minimum of about 15% illumination fraction whereas a glass ball with index around 1.6 would require a greater area to be illuminated, around 80% as minimum illuminated fraction to produce a SB in this example. This is because if the index is high, the difference in optical paths (length to a given plane) between a ray passing along the optical axis and a ray further from the centre is large, and a smaller entry surface is needed to disturb the wavefront. If the index decreases, the difference in optical paths (length to a given plane) between a ray passing along the optical axis and a ray further from the centre is smaller than for the case of high index, and a larger surface is needed to disturb the wavefront.

The important factor is that the beam traverses a lens volume sufficient to provide a difference in the propagation distance and thereby the phase difference for the parts of the beam traversing and thus changing wavefront and exiting the lens at different distances (for non-parallel illumination) or angles (for parallel illumination) from the optical axis. The difference from the ideal spherical (planar) wavefront is called optical aberration.

Preferably, the optical aberrations comprise rotationally symmetrical aberrations. Rotationally symmetric spherical and defocus aberrations are of particular importance for the generation of structured beams. Preferably the optical aberrations comprise the addition of the spherical aberrations provided by the convex lens and focusing element and the defocus is provided by the arrangement of the convex lens and focusing element (the lens system). For a combination of two or more optical elements (e.g. the convex lens and the focusing element), defocus plays an important role. Defocus refers to the translation along the optical axis away from the plane of best focus.

In this fashion, if the beam is focused on to the convex lens entry surface and the illumination fraction is thus almost 0%, the focus must correspond to the size and refractive index of the ball in such a way that when the beam exits the convex lens, the difference in propagation distance for the rays of different angles from the entry surface will have resulted in a phase delay in such a way to give the desired wavefront when exiting the convex lens.

The wavelength of the electromagnetic radiation provided by the source may be chosen to suit a particular application. For example the wavelength could be in the infrared, visible or ultraviolet ranges of the spectrum. Multiple wavelengths may be used, for example the source may comprise a source of white light or a superposition of radiation from two or more sources may be used.

In certain preferable examples of the present invention the source is arranged to provide substantially parallel illumination of the convex lens with a selected illumination fraction of at least 15%, preferably at least 20% of the radius of curvature of the entry surface so that the beam passes substantially symmetrically through the centre. Such examples of the invention provide high quality structured beams, when combined with a focusing element arranged to focus the beam emerging from the convex lens. The quality is further increased by increasing the illumination fraction beyond its minimum value such that it is preferably above 50% and more preferably close to 80%, depending on the refractive index.

"Parallel illumination" is used to describe the theoretical situation in which the illuminating rays are perfectly parallel, as is provided by a point source an infinite distance from the illuminated object such that the spherical wavefronts become plane waves. The expression "substantially parallel illumination" is therefore used to refer to the approximation of this situation in which the rays incident on the lens are approximately parallel such that divergence effects due to a difference in incident angle between rays are negligible.

Preferably the focusing element may be one of a focusing lens; a ball lens; a spherical mirror; and a high-index ball used as a retroreflector.

When the convex lens is arranged between the electromagnetic radiation source and the focusing element such that the focusing element focusses the beam emerging from convex lens the position of the interference field in the focal plane of the focusing element is projected by the focusing element to directions of the structured beam so a long-distance structured beam is created. It consists of almost negligible apex angle altering light and dark coaxial cones.

In this way, the divergence is significantly decreased and the generated structured beam can be projected over increased distances with little degradation in beam quality.

When a Gaussian beam passes through a focusing lens, the whole beam is focused toward a point where the beam waist is the smallest, after which it diverges again. The situation is different for the structured beam generated by the present invention. Exiting the convex lens, a part of the wavefront provides propagation parallel or almost parallel to the optical beam axis (also referred to as the z axis), resulting in continuous convergence along the axis as described previously. However, the part of the wavefront further from the centre with larger angle compared to the z axis, would without a lens diverge quickly away. Advantageously the effect of the focusing element is to flatten the wavefront further and thus focus a larger amount of the full wavefront along the z axis, from one point close to the focusing element and toward infinity which provides the increased range of the divergent beam.

The properties of the structured beam generated by the present invention mean that it is possible to achieve both a small diameter (on the order of 100 times smaller central spot size than a normal Gaussian beam, depending on the optical set-up) and small divergence (on the order of 100 times smaller than normal Gaussian beam, depending on the optical set-up). This allows the structured beam to travel over large distances while maintaining a well-defined intensity distribution. The cross section of the beam displays a well-defined regular structure—including the roundness of the central beam and rings—with clear continuous edges having a high contrast between light and no-light areas. The present invention thereby allows the creation of a structured beam which can propagate over long distances while having a quality comparable with or better than that produced with axicons over much more limited distances.

A further advantage of the present invention is that the structured beam generated with a convex lens and a focusing element can be remarkably insensitive to angular variations in the incoming beam. Varying the incident angle of the illumination on the spherical entry surface of the convex lens results in a linear but much smaller change in the angle of the output structured beam. The optical system according to the present invention is therefore much more straightforward to align than prior art systems. It also makes it possible to create a superimposed structured beam by having different beams enter the spherical entry surface of the convex lens from different angles.

In certain embodiments, the focusing element comprises a converging lens and the convex lens and focusing element have common focal points. This arrangement acts as a Keplerian beam expander and allows for input and output rays almost parallel with the optical axis.

In certain preferable embodiments, the present invention further comprises a second focusing element arranged further along the optical axis of the optical system but radially displaced into a wider part of the structured beam having lower intensity. The second focusing element may be arranged to produce an image of the initial part of the structured beam after it has diverged slightly after travelling some distance from the first focusing element. The second focusing element may be described as a "secondary SB generator". The secondary beam is produced between the second focusing element and the focal point of this element. It takes parts of an existing SB as input, and focuses it, with the effect of generating a more focused and defined SB within the original one. The principle is substantially the same as for the focusing lens placed after the convex lens and has the effect that even lower divergence may be achieved over greater distances. The second focusing element may be a glass ball, spherical mirror or a large focusing lens for example. In some embodiments it may be positioned outside of the visible cross-sectional area of the primary beam to produce a secondary visible beam.

In certain preferable embodiments the convex lens is a biconvex lens having a spherical exit surface. The biconvex lens may preferably comprise one of: a ball lens; a truncated ball lens comprising a ball lens with two opposing surfaces cut away; and a thick bi convex lens comprising an elongate body between the spherical entry and exit surfaces.

The "truncated ball lens" may be formed as the intersection of a ball and cylinder, or prism, where the cylinder has a small radius, prism has smaller diagonal, than the ball radius.

The inventors have discovered that the refractive characteristics provided by a high refractive index biconvex lens have spherical entry and exit surfaces allow a particularly high quality structured beam to be generated, which has further decreased divergence.

Using this arrangement, the cross-sectional intensity distribution of the structured beam has the form of a small central spot surrounded by concentric rings where the central spot is of very high intensity. The central spot remains well defined over long distances so the system is therefore particularly suited to high precision and/or long range measurement.

As the structured beam using particular generator setups has a low sensitivity to angular changes in the direction of the illuminating radiation the system is easy to align and multiple illuminating beams may be combined into a single structured beam.

The spherical entry and exit surfaces may have the same or differing radii of curvature. For example the entrance surface may have a small radius of curvature and the exit surface may have a larger radius of curvature. By changing the radius of curvature, and therefore the focal length, of the entry and exit surface, the properties of the structured beam may be varied.

In certain preferable embodiments the distance between the convex lens and the focusing element is adjustable to vary parameters of the structured beam. In particular, adjusting the distance between the convex lens and the focusing element can be used to adjust the focus, thereby changing the divergence of the beam. The adjustment also varies the number and intensity distribution of the rings around the central spot in the cross-sectional intensity distribution.

In some embodiments the optical system further comprises an aperture. The aperture may be configured to block either the central part or outer part of the beam, for example to block the central spot or surrounding rings. The aperture may be positioned either before or after the lens. In this way the cross-sectional range of the beam may be configured. Also, blocking certain parts of the beam and thereby blocking contributions from certain parts of the wavefront may configure the longitudinal range of parts of the beam such as the central spot, since different parts of the wavefront converge and superimpose on different points along the z axis and the beginning and/or end of the central line can be affected.

In preferable embodiments, the set-up may be used for a wide range of source wavelengths with the same components.

In certain embodiments the convex lens has a refractive index of greater than 1.9, preferably greater than 1.95, such as approximately 2.0. In certain embodiments the convex lens has a refractive index of less than 2.05.

The inventors have found that the quality of the beam may be improved by using an increased refractive index of the convex lens. In particular changing the refractive index of the convex lens has a delicate influence of the wave front of the resulting structured beam. A refractive index of approximately 2.0 (for example between 1.95 and 2.05) has been found to be particularly preferable.

Advantageously, using the high refractive index convex lens and second focusing element (where the focusing element is slightly defocused such that the focuses of both lenses are not exactly in one point but a little bit shifted) the wavefront of the propagating radiation takes on an additionally flattened shape in and around the centre of the wavefront. This portion increasingly comprises waves that are propagating almost parallel to the optical system axis, while the curve of the wavefront near the beam edges causes the contribution from waves of larger angles to diverge away rapidly, leaving a highly defined spot surrounded by highly defined rings. In this way at increasingly large distances from the convex lens, the central spot comprises the superposition of increasingly parallel waves and as such the divergence is markedly reduced, compared to a Gaussian beam in which diffraction phenomena limits low divergence.

Where the illumination fraction is greater than 20%, preferably greater than 50% and more preferably close to 80% of the radius of curvature of the biconvex lens, the structured beam that is generated is particularly high quality with a clear and bright central spot.

In certain preferable embodiments, the incident intensity is spread substantially uniformly over the surface of the biconvex lens such that the emerging structured beam has a well-defined intensity distribution. Using a Gaussian beam as input is a cheap and easy way to provide substantially coherent irradiation with sufficiently even intensity distribution.

In certain preferable embodiments the convex lens is a glass ball lens and the focusing element is a converging focusing lens. In such embodiments the long distance structured beam is generated due to the spherical aberrations of glass ball lens (the focusing lens is assumed to have almost negligible spherical aberrations) and the defocus of the lens system. Such an embodiments can easily produce a Keplerian beam expander with a high expansion ratio.

Alternatively the convex lens is a glass ball lens and the focusing element is a glass ball lens. In such embodiments, preferably both glass ball lenses have a refractive index of greater than 1.8. The two glass ball lens may be combined into a single integral structure, referred to herein as a "ballinder". In particular the integral structure may comprise a single body of refractive material, such as glass, which can provide the same effects as the use of two separate ball lenses. The refraction of the beam may be provided solely by the refractive material of the two glass balls with the adjoining refractive material have little or no effect or the integral lens may be configured such that the beam is additionally refracted by the adjoining refractive material. In such embodiments the focusing element is provided by a region of the integral structure, e.g. the region relating to the second ball lens. The radius of curvature of the input and output surfaces may differ. Regions of the integral structure may comprise material having differing refractive indexes.

In certain embodiments the focusing element comprises a spherical mirror and the optical system further comprises a beam splitter arranged between the convex lens and the spherical mirror. In this way, the system may produce two structured beams after being split by the beam splitter, which may be advantageous in certain applications, for example when used for alignment.

In certain embodiments the convex lens comprises a glass ball lens and is configured such that a portion of the illuminating beam is reflected back through the convex lens from the rear surface of the convex lens, thereby forming a retroreflector in which the illuminating beam is reflected and focused by the double pass of the beam. In such embodiments the glass balls lens is both the convex lens and the focusing element as during the second pass of the illuminating beam through the glass ball lens it is focused along the optical axis. Preferably the glass ball lens comprises a reflective layer on a far side of the glass ball lens from the source such that the glass ball lens forms a retroreflector, reflecting the beam back through the convex lens to focus the emerging structured optical beam along the optical axis. In such cases the reflective layer can be considered the focusing element. In embodiments where the glass ball lens forms a retroreflector, preferably the refractive index is greater than 1.95 and preferably less than 2.05.

In a further aspect of the invention there is provided a method of producing a structured optical beam, the method comprising: providing a convex lens having a spherical or cylindrical entry surface, the convex lens comprising a material having a refractive index of at least 1.8; providing an electromagnetic radiation source configured to provide a substantially coherent beam of electromagnetic radiation; providing a focusing element arranged along the optical axis of the optical system and arranging the electromagnetic radiation source so as to provide an illuminating beam which illuminates the convex lens over a selected illumination fraction of the spherical or cylindrical entry surface and with a corresponding selected focus of the illuminating beam such that the beam traverses a sufficient refractive volume of the convex lens to produce aberrations in the beam emerging from the convex lens such that it comprises a structured optical beam.

The method may further include features corresponding to each of those described above with respect to the optical system.

In a further aspect of the invention there is provided a system for optical alignment of objects, the system comprising: an optical system for generating a structured beam as described in the claims; a plurality of objects to be aligned; and one or more means for detecting the position of the objects relative to the structured beam.

Using such an optical alignment system, the structured beam can be used as the carrier of a common reference axis for objects to be aligned relative to it or to be aligned with respect to each other. The fact that the beam is very narrow and non-diverging for long distances means alignment can be carried out with high precision. Furthermore, the central part of the beam is small enough to be analysed on position sensors of relatively small size (i.e. CCD size) at very long distances without changing the beam focusing. The very sharp shape of the central peak of intensity and the large contrast between the central part and the surrounding rings are properties which make the accurate detection of the position of the beam possible.

In some embodiments, the analysis of the structure of the beam can be used to increase the precision of the system and could be used for making such processes robust to beam curvature due to atmosphere crossing. In particular, the observed beam (or, rather, the transverse cross-section) will exhibit an unexpected elongation of the shape in the direction of the atmospheric gradient.

In some embodiments of such optical alignment systems, one or more secondary structured beams created from extra lenses or balls placed in the field are also usable for position detection and allow multipoint alignment system setups. The self-reconstruction property of the structured beam (the fact that the structured beam may reform around an object placed in its path) is also potentially usable for alignment systems and multipoint alignment systems.

The creation of a multi-wavelength structured beam can be used to measure and to compensate the effects of the atmosphere on the straightness and fluctuations of the SB line. It also provides the possibility to adjust and choose the wavelength of the multi-wavelength SB, for example in the central spot, for two-wavelength or frequency scanning interferometry.

The means for detecting the position of the objects to be aligned relative to the structured beam may include one or more of: a position sensing device, a radial position sensor, a screen placed in the beam path and a screen observation device, a secondary structured beam generator (or means to regenerate or additionally focus the structured beam) placed in the beam path, a secondary lens placed in the beam path and a position sensor configured to detect the secondary structured beam. The means for detecting the position of the objects may be mounted to the objects to be aligned such that their position relative to the beam axis may be determined.

The means to detect the position of the objects may be placed on the primary structured beam path, a reflected structured beam path or a secondary structured beam path. The components of the system may be placed on the optical axis or off axis with the beam directed to them using beam splitters or mirrors.

In a further aspect of the invention there is provided an optical system for producing a structured optical beam, the system comprising: a convex lens having a spherical or cylindrical entry surface, the lens comprising a material having a refractive index of at least 1.6; an electromagnetic radiation source configured to provide a substantially coherent beam of electromagnetic radiation; wherein the source is arranged to illuminate the convex lens over a selected illumination fraction of the spherical or cylindrical entry surface and with a corresponding selected focus of the illuminating beam such that the beam traverses a sufficient refractive volume of the convex lens to produce aberrations in the beam emerging from the convex lens such that it comprises a structured optical beam. Although the above aspects of the invention have been defined with a refractive index of at least 1.8, in some aspects of the invention the refractive index may be greater than 1.6 and is still capable of generating a long distance structured beam, albeit of lesser quality than arrangements using a refractive index of greater than 1.8. Nevertheless arrangements using a refractive index of 1.6 or more may produce a beam suitable for certain applications.

BRIEF DESCRIPTION OF THE DRAWINGS

Embodiments of the invention will now be described, by way of example only, with reference to the accompanying drawings, in which.

DETAILED DESCRIPTION

Figure 1A:
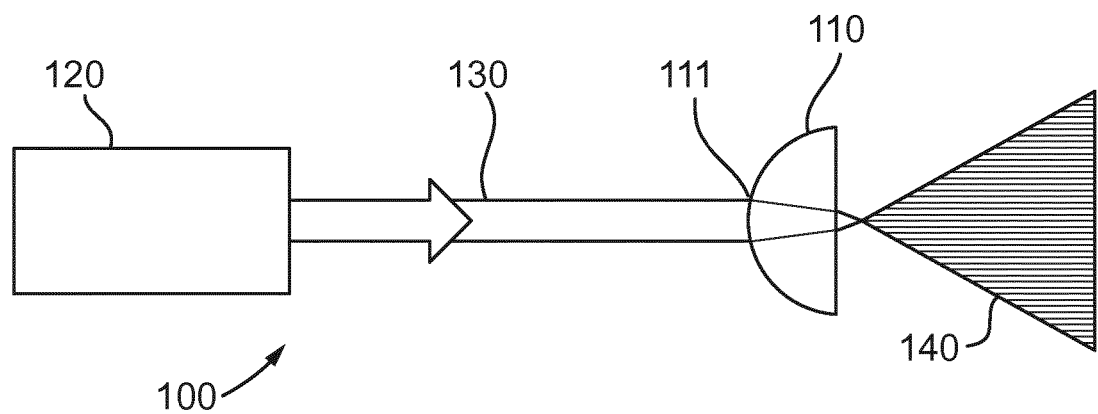
FIG. 1A schematically illustrates a comparative example of an optical system which does not include a focusing element.

FIG. 1A schematically illustrates an optical system 100 for producing a structured optical beam The optical system 100 comprises a convex lens 110 having a spherical entry surface 111 which is illuminated by a source of electromagnetic radiation 120. The convex lens 110 comprises a material having a high refractive index, in particular a refractive index of at least 1.6. The electromagnetic radiation source 120 is configured to provide a substantially coherent beam of electromagnetic radiation 130. The electromagnetic radiation source 120 is arranged to illuminate the convex lens 110 over a selected illumination fraction of the spherical entry surface and with a corresponding selected focus of the illuminating beam 130 such that the beam traverses a sufficient refractive volume of the convex lens 110 to produce aberrations in the emerging beam 140 such that it comprises a structured optical beam 140. In this way, a diverging structured optical beam 140 emerges, following refraction of the illuminating beam 130 through the convex lens 110.

In the case of FIG. 1A, the selected focus of the beam illuminating beam 130 is such as to provide substantially parallel illumination of the convex lens 110. The illumination fraction is large enough in order to ensure the beam traverses a sufficient refractive volume of the lens 110 to produce the aberrations in the beam such that the emerging beam is a structured optical beam—in this case around 20%. The appropriate choice of the focus of the beam 130 and the illumination fraction is discussed in more detail below.

The electromagnetic radiation source 120 of FIG. 1A is provided by a conventional laser such that the illuminating beam 130 is substantially coherent—the light produced has a substantially constant phase difference and a single frequency, and may be provided by a conventional laser. The laser 120 also provides substantially parallel illumination, namely illumination in which the illuminating rays arrive at the lens substantially parallel to each other. Furthermore in this example the laser 120 produces a beam with a substantially Gaussian intensity distribution.

Figure 2:
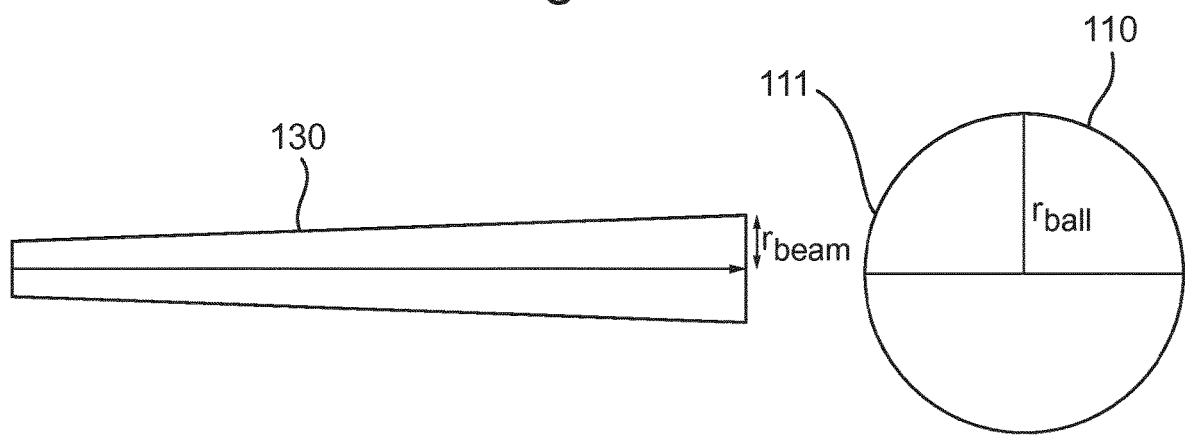
FIG. 2 schematically illustrates the requirements of the illumination fraction of the convex lens by the illuminating beam.

FIG. 2 illustrates the definition of the illumination fraction of the spherical entry surface 111 of the convex lens 110. As shown this parameter is provided as a percentage describing the ratio of the radius of the beam $r_{beam}$ to the radius of the convex lens $r_{ball}$.

Structure of the Generated Beam

Figure 1B:
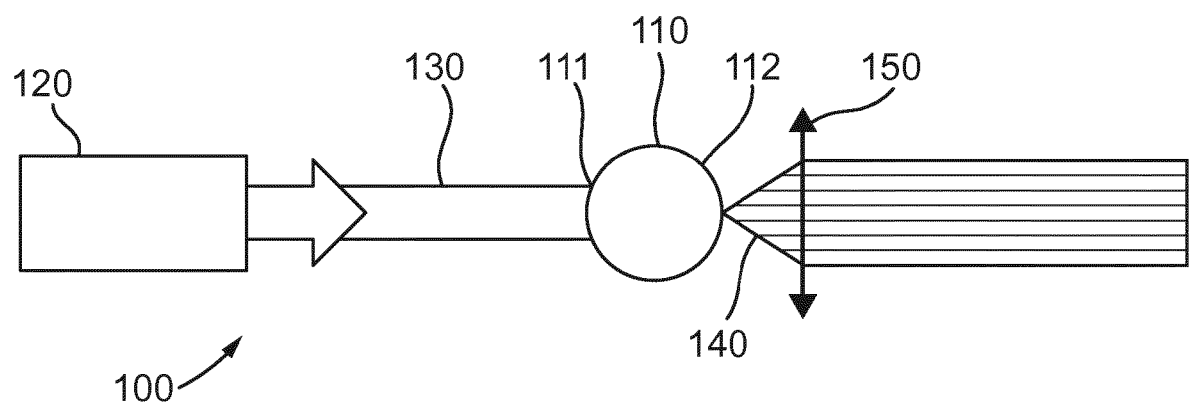
FIGS. 1B to 1C schematically illustrate an embodiment of an optical system for generating a structured optical beam according to the present invention.
Figure 1C:
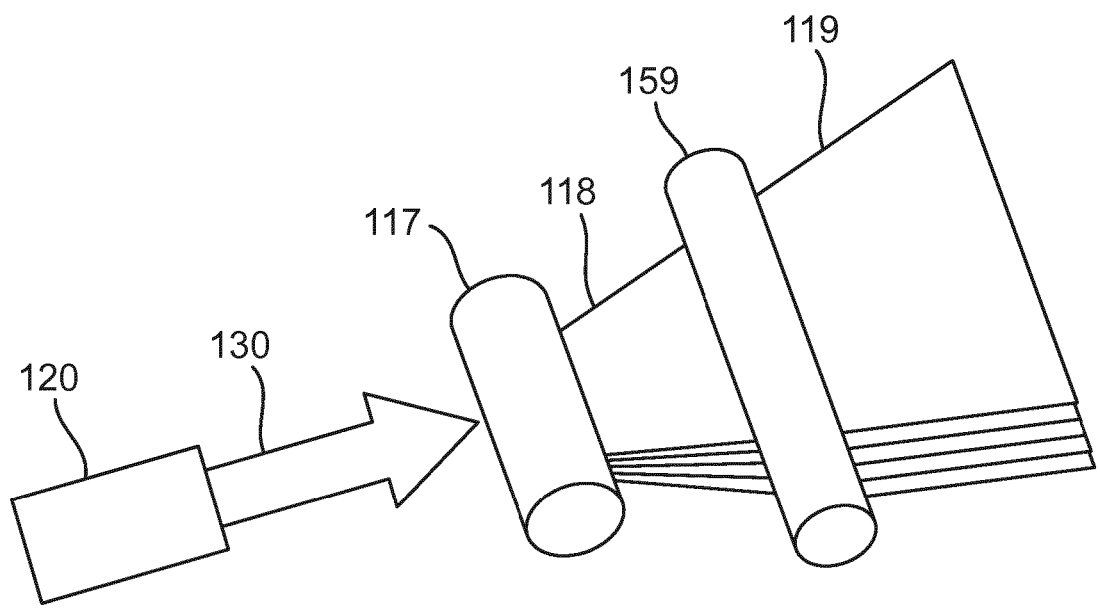
Figure 1D:
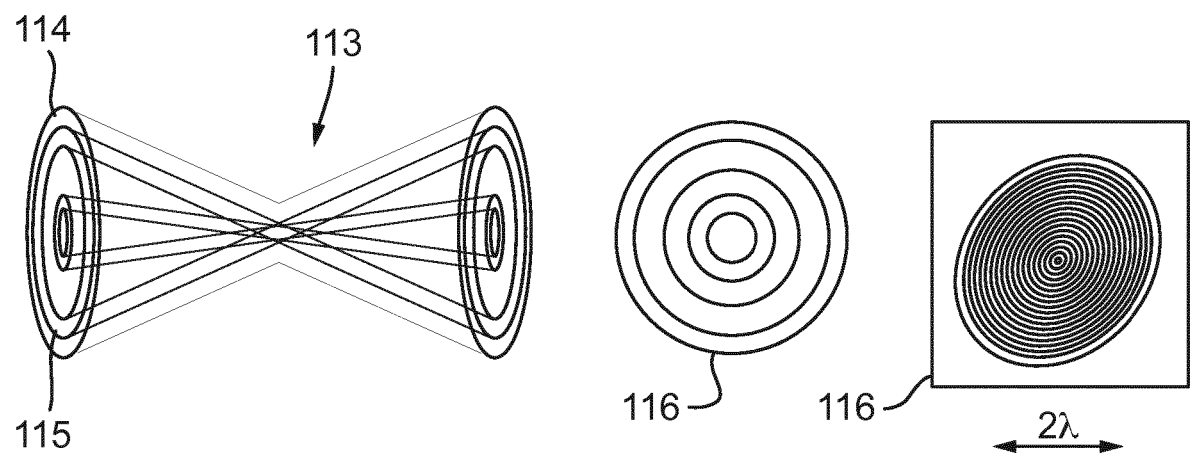
FIG. 1D illustrates the detail of the emerging interference field 113 which comprises the structured beam.

FIG. 1D illustrates the detail of the emerging interference field 113 which comprises the structured beam. This stationary field comprises an alternation of light cones 114 with transversal polarization and dark cones 115 with longitudinal polarization. The beam transverse cross-section 116 shows alternation of light and dark rings, providing a structure smaller than a wavelength at the waist. This is possible through the creation of a field in a very small volume of the order of a few wavelengths in the longitudinal and transverse directions) that has areas of stationary longitudinal polarisation—these areas correspond to the dark cones (which again correspond to the dark rings in the transverse cross-section). The light areas have transverse polarisation. However, in the dark areas the waves superposition in such a way that there is no transverse field, only longitudinal polarised stationary field, in some areas purely electric, in some areas purely magnetic, and a combination in between. The presence of these stationary fields of longitudinal polarisation makes it possible to go below the diffraction limit as given by the Heisenberg uncertainty principle, which is related to the density of areas of transverse electromagnetic polarisation.

Generating a Long Distance Structured Beam

Although, as described above, the components of FIG. 1A are sufficient to produce a structured beam which may be used for certain applications, in order to propagate the beam over much larger distances, a focusing element is required.

The properties of such a system, in particular the interplay of the aberrations and the defocus of the system, is discussed below.

Optical aberration describes how a light wave is affected upon transmission through an optical element or system. A system with a high refractive index convex lens and focusing lens acts as a Keplerian beam expander with input and output rays almost parallel with the axis. Every position of the ray in the entrance/exit pupil has a change in phase (or optical phase delay, different optical distance), relative to the central ray. The phase delays of each ray are added after passing through elements and systems. The aberrations are often shown as a delay of the ray (counted by wavelengths) as function of pupil coordinate.

As mentioned above, rotationally symmetrical aberrations are of particular importance for the generation of structured beams. The standard set-up for structured beam generation acts as a Keplerian beam expander consisting of two converging lenses with common focal points. Every optical element with a spherical surface is the source of spherical aberration: rays further from the optical axis are refracted differently than those in or close to the axis. For a combination of two or more elements, another aberration plays an important role: defocus. Defocus refers to the translation along the optical axis away from the plane of best focus.

Figure 3A:
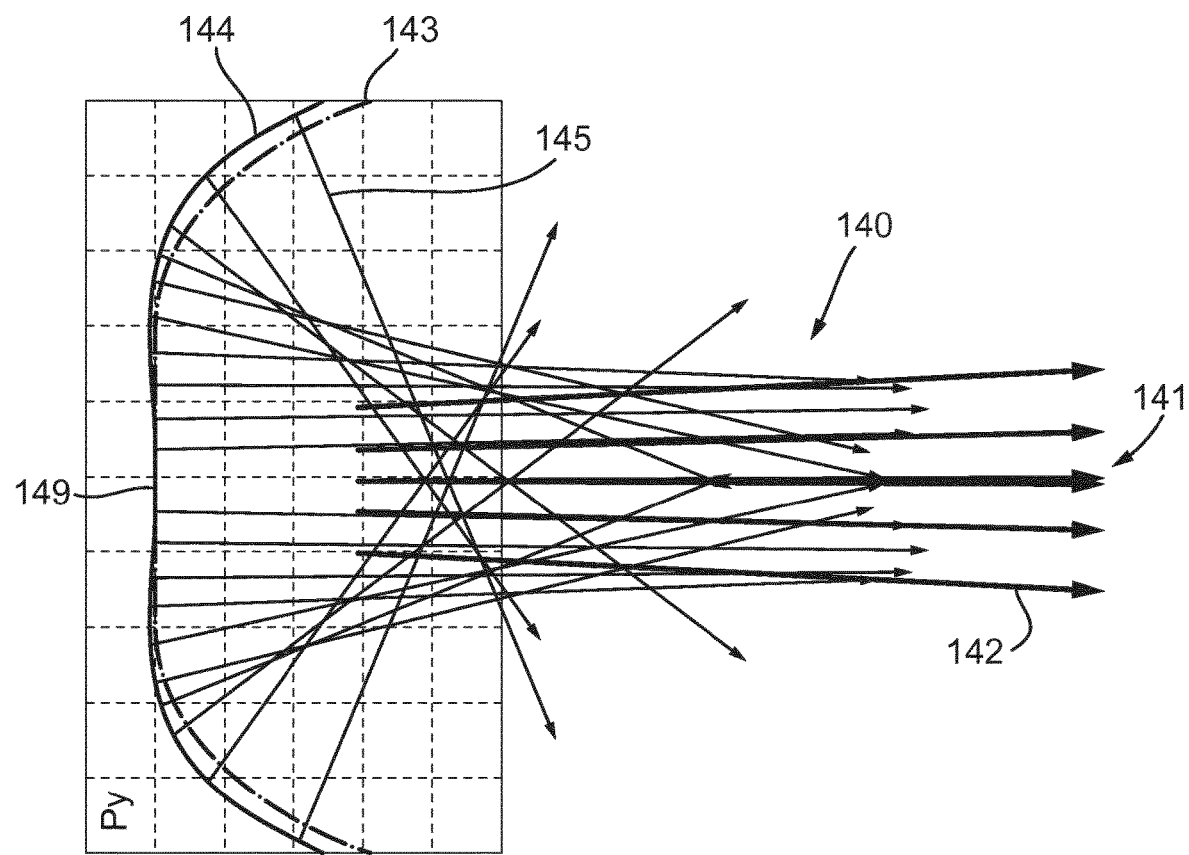
FIGS. 3A and 3B schematically illustrate ray diagrams showing the wavefront of the beam after it has been diffracted through the convex lens and focusing lens.

The resulting aberration of the SB system (ball and lens, acting like a Keplerian beam expander) is the addition of spherical aberration of two lenses and the aberration from defocus of the system. This aberration determines the shape of the outgoing wavefront. The optimal wavefront is shown in FIG. 3A: it is flattened in the central area, resembling a planar wave; and has a slight bulge in the centre.

There are several ways to produce the aberration and defocus needed to obtain this optimal wavefront including:

1) Ball and lens: the aberration is given by the spherical aberration of the convex lens (must be illuminated with the required illumination fraction) and the defocus of the system. We assume that the focusing lens has little (almost negligible) spherical aberration. This is discussed below and shown in FIG. 3B.

2) Lens and ball: The spherical aberration of the first lens has little (almost negligible) spherical aberration. The resulting aberration is given by defocus of the system and the spherical aberration of the second element, which is a convex lens (the output beam must satisfy the required illumination fraction). This corresponds to FIG. 4A.

3) Two balls, ballinder, or retroreflection in one ball: Two spherical aberrations of the first and second ball (aberration by defocus is limited when using refraction index 2.0, at which point the two balls are touching and no positive defocus is possible), ballinder (thick lens with two surfaces) or two lenses, with the strong spherical aberration and defocus, or doubling spherical aberration of one ball by double pass of beam after reflection on the back side of the ball. See FIGS. 4B, 6, 7B, 8 and 9.

Ball Lens and Focusing Lens

This arrangement, shown in FIG. 1B, is advantageous because it can easily produce a Keplerian beam expander with a high expansion ratio (diameter of output beam/diameter of input beam=focal length of the first element/focal length of the second). For high expansion ratio, the crossing waves are crossing at a wider angle and the central part is narrower. This results in the particular type of wavefront which is able to create the structured beam over a long distance.

In the embodiment of FIG. 1B the high refractive index convex lens 110 is provided by a high-index glass ball 110. The glass ball 110 has opposing spherical entry 111 an exit 112 surfaces through which the illuminating beam 130 is refracted to produce the long-distance structured optical beam 140.

Due to the refractive properties of the ball, the different radial segments of the incoming beam 130 follow different paths with different phase delays as they are refracted through the high refractive index glass ball 110. When these emerge from the exit surface 112, the resulting superposition of waves creates a field with a structured cross-sectional intensity distribution. This structure of the beam 140 emerging from the ball lens 110 may have parts of dimensions smaller than one wavelength at the waist and may contain areas of a stationary field with longitudinal polarisation in combination with areas of propagating waves.

This effect is illustrated in FIG. 3A, which shows the formation of the wavefront 143, 144 which emerges from the focusing lens 150 after refraction through the convex lens 110 and focusing lens 150. Two wavefronts 143, 144 are illustrated which correspond to two different refractive indices of the lens, as discussed further below. FIG. 3A shows how rays at different radial distances from the optical axis follow different paths, this spherical aberration effect causing the rays 145 to be focused and converge along the optical axis. The superposition of the waves corresponding to these rays 145 creates the structured beam 140, comprising the highly intense central spot 141 and surrounding rings of intensity 142.

Figure 3B:
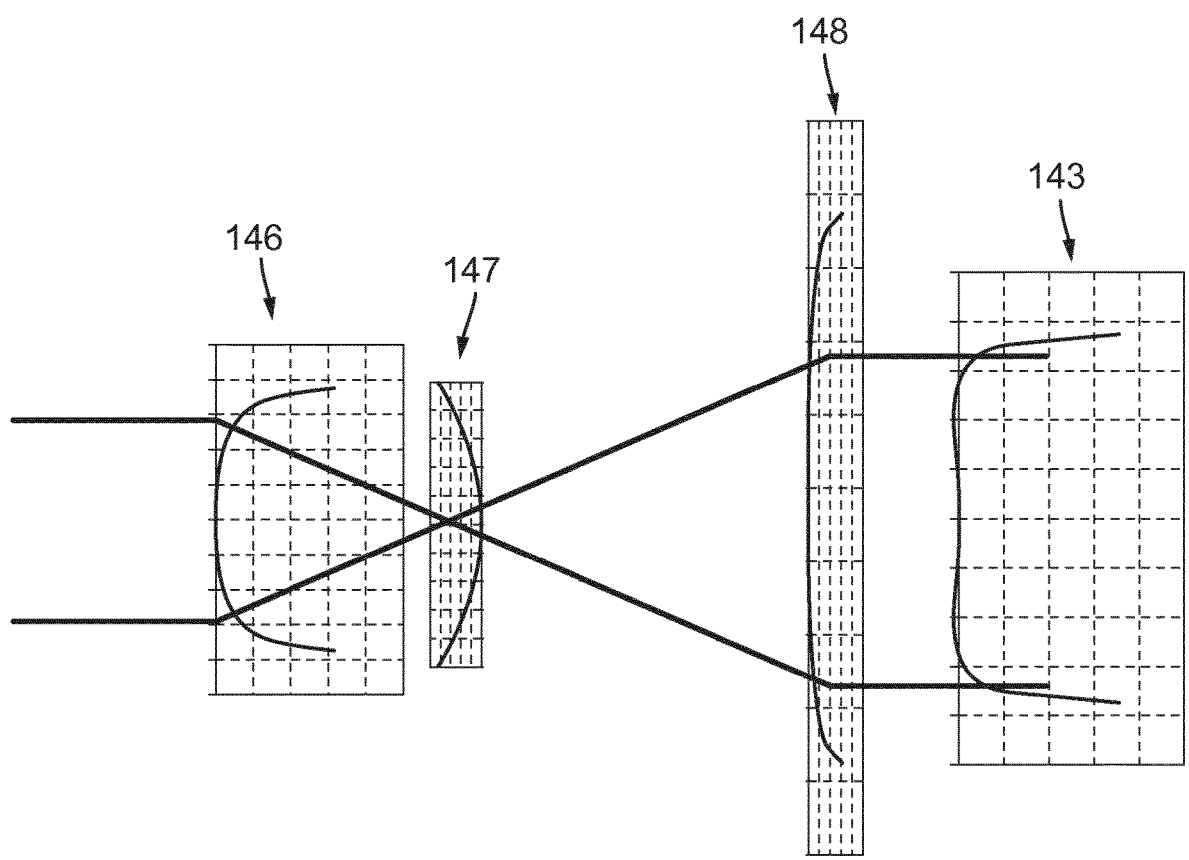

FIG. 3B illustrates the addition of aberrations of system for structured beam generation. The aberrations imparted on the beam comprise spherical aberration 146 due to the convex lens 110 and defocus aberration 147, provided by the relative displacement of focal points of convex lens 110 and focusing lens 150 and almost negligible aberration of the focusing lens 148. This produces the final aberrations of wavefront 143.

The transverse cross-section 146 of the generated structured beam 140 shows a pattern similar to a Bessel or Airy-type beam, with a bright or dark central spot surrounded by a set of bright and dark concentric rings. The system can also be configured to produce a dark central spot, surrounded by rings. The dark rings have nearly zero intensity, but still show longitudinal polarization. The central spot 141 is a very high intensity beam around which the surrounding concentric rings 142 are positioned, each having dark rings between them of almost zero intensity. Beyond a certain ring, the intensity drops significantly, although there are still concentric bright and dark rings of greater radius but with much lower intensity. This means that, although the beam seems to be confined within a certain area of visible concentric rings, the beam actually spreads out much beyond this—see for example the rapidly diverging rays 145. This is referred to as the full structured beam field. The number of rings and their diameters (in high intensity central region as well as the low intensity outer regions) can be adjusted. This is most easily done by varying the distance between the convex lens 110 and focusing element 150. The specific choice of refractive index of the convex lens 110 also affects the ring pattern. Because the refractive index depends on the wavelength, the wavelength of the electromagnetic radiation source 120 also affects the ring pattern.

The refractive index of the convex lens 110 is greater than 1.6 but preferably greater than 1.8 and more preferably close to 2.0 to provide the highest quality structured beam, with the exact choice having a delicate influence on the wavefront and the resulting beam. The diagram of FIG. 3A shows the difference between a refractive index of 1.99 (shown by wavefront 143) and refractive index 1.98 (shown by wavefront 144). Arrows 145 show the direction (the wave vectors) of the waves emerging from the focusing lens 150.

For a higher refractive index, it can be seen in FIG. 3A that, closer to the lens, the central spot 141 results from the superposition of waves coming in from larger angles, from the outer diameter of the beam. Closer to the centre of the beam, the waves 145 are almost parallel and at increasing distance from the lens they provide an increasing contribution to the central spot 141. Therefore, blocking the outer waves contributing to the near-distance field will affect the beam to begin at a further distance. Similarly, blocking the central waves contributing to the long-distance field will limit the propagation distance of the beam. Blocking the very central part may give a smaller and more defined central spot at large distances, since the rays in or very close to the optical axis may be affected by the diffraction limit. Blocking parts of the wavefront can be done either before or after the focusing element, or just for the convex lens without a focusing element.

When the refractive index approaches 2.0, the wavefront 144, 143 begins to flatten in the central area, resembling a planar wave, as illustrated in FIG. 3. It can also be seen from FIG. 3A that the wave front 144, 143 bulges slightly in the centre 149. This "bulge" 149 is given by the refractive index but also depends on the set-up of the optical system, such as the distance between the focusing lens 150 and convex lens 110. This particular shape of the wavefront is advantageous. In any experimental set up there is always some divergence, meaning that the waves from a "flat" centre of the wavefront will diverge slightly as it propagates, increasing the spot size and possibly causing a blurring of the surrounding rings. Having a wavefront with a slight bulge in the centre means that this central contribution diverges and vanishes rapidly, such that the central spot at increasing distances from the lens is made increasingly from the superposition of parallel waves. This continuous creation of a small central spot along the axis of propagation results in significantly less divergence. The optical system 110 allows the creation of a structured beam 140 with a quality comparable to those created with known axicon systems but it can be sustained over much greater distances.

Furthermore, when generated with a focusing element 150, the structured beam is remarkably insensitive to angular variations in the incoming beam. Varying the angle of the illuminating beam 130 from the source 120 entering the ball 110 results in a linear but much smaller change in the angle of the output structured beam 140—roughly two orders of magnitude smaller. The degree of angular insensitivity is proportional to the focal length of the focusing element 150 compared with that of the convex lens 110.

Variations in the Set-Up of the Optical System

The embodiment of FIG. 1B, utilising a laser 120, a spherical high refractive index glass lens 110 and a focusing lens 150 provides a particularly high quality low divergence structured beam 140. However there are various alternative arrangements of the system which provide further advantages and may be suited to differing applications.

FIG. 1C shows the possibility to generate a Bessel spatial structured beam at one dimension only. This can be achieved by replacing spherical surfaces by cylindrical ones. The electromagnetic radiation source 120 is configured to provide a substantially coherent beam of electromagnetic radiation 130 to illuminate cylindrical lens 117 with sufficient illumination fraction of the cylindrical entry surface such that the beam traverses the required diffractive volume of the lens 117. The structured beam then looks like a set 118 of dark and light planes, inclined with a small angle to each other. The focusing cylindrical lens 159 can concentrate the planes into an almost parallel-plane-structured beam 119, whose cross-section looks as parallel line segments. The intensity of light in such a structured beam is given by the Gaussian function along the line segment and the Bessel function at cross-section.

Figure 4A:
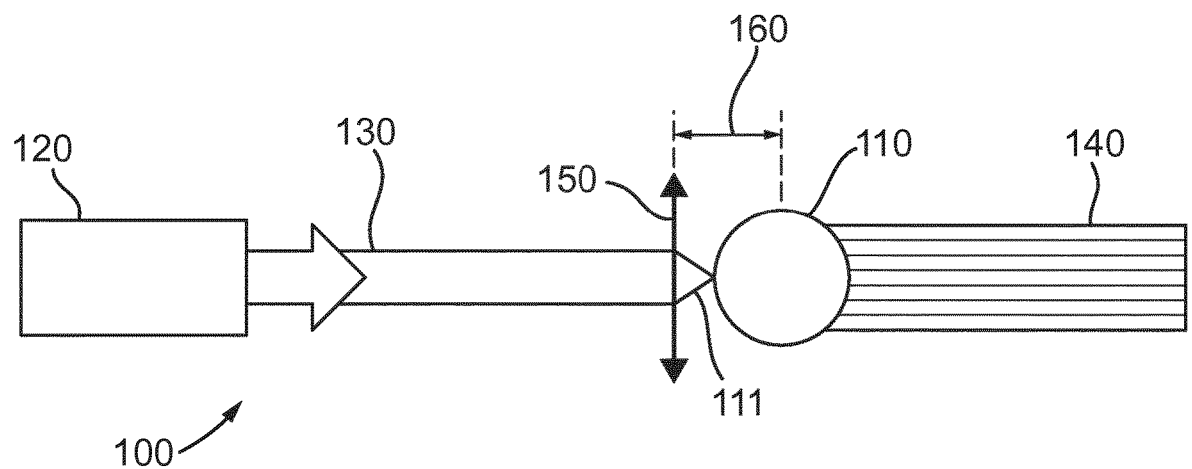
FIGS. 4A and 4B schematically illustrate further embodiments of an optical system for generating a structured optical beam according to the present invention.
Figure 4B:
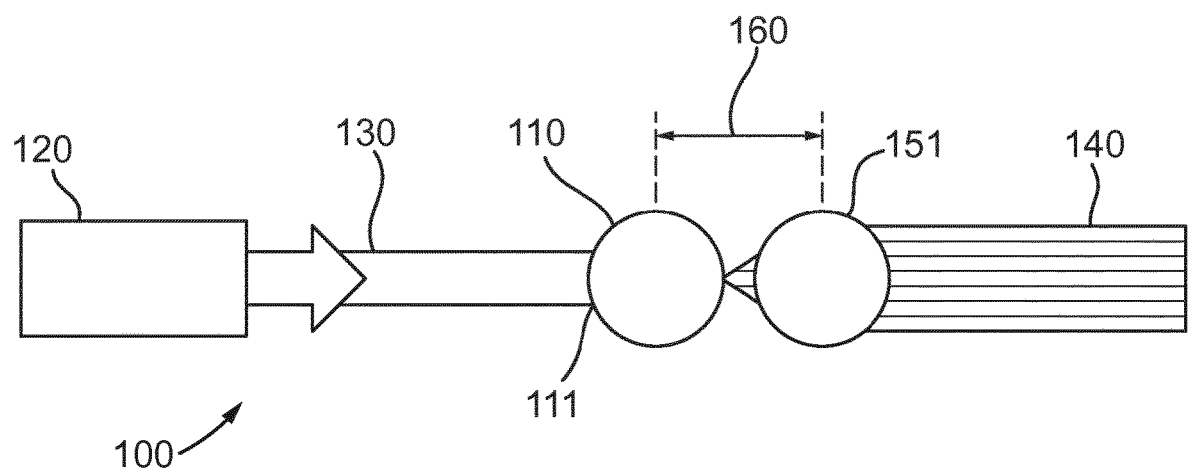

FIGS. 4A and 4B illustrate alternative configurations of an optical system 100 according to the present invention.

In FIG. 4A the order of the focusing element and the high refractive index glass ball is reversed so that the illuminating beam 130 provided by the source of the electromagnetic radiation 120 is first incident on a focusing lens 150 which focuses the beam onto the high refractive index glass ball 110 to produce the structured beam 140. In this case the selected focus is such the illuminating beam 130 is not parallel but focused onto the spherical entry surface of ball lens 111. Because of this focusing of the illuminating beam, the selected illumination may be lower than the 15% or 20% previously stated, as the path of the refracted rays within the spherical lens 111 is such that a sufficient refractive volume is traversed to provide the aberrations in the beam.

Although the most commonly used set up utilises a high-index glass ball 110 to create the structured beam 140 and then a focusing lens 150 to propagate it over long distances, it is equally possible to put the focusing lens 150 before the glass ball 110 and this will also generate a long distance structured beam 140. As with the embodiment of FIG. 1, the focusing lens 150 may be provided by any appropriate focusing system to focus the incoming rays along the optical axis. As indicated by arrow 160 the distance along the optical axis between the focusing lens and the high-index glass ball may be varied. Variation of this parameter allows the focus aberration, the divergence of the beam and the number and thickness of rings to be varied.

As shown in FIG. 4B, instead of the focusing lens 150, a second glass ball 151 can be used to focus the structured beam to propagate over long distances 140. The refractive index of the second glass ball 151 can vary, depending on the requirements of the application and does not necessarily need to be a high refractive index glass ball as in the case of the primary convex lens 110. The secondary glass ball 151 may be positioned before or after the high refractive index glass ball 110 along the optical axis. As with all other embodiments, the distance between the focusing element and the high refractive index convex lens may be varied to adjust the parameters of the generated structured beam 140. Similarly, as with all embodiments, the specific refractive index of the high refractive index convex lens 110 may vary, with the best results typically obtained with a refractive index approaching 2.0.

Figure 5A:
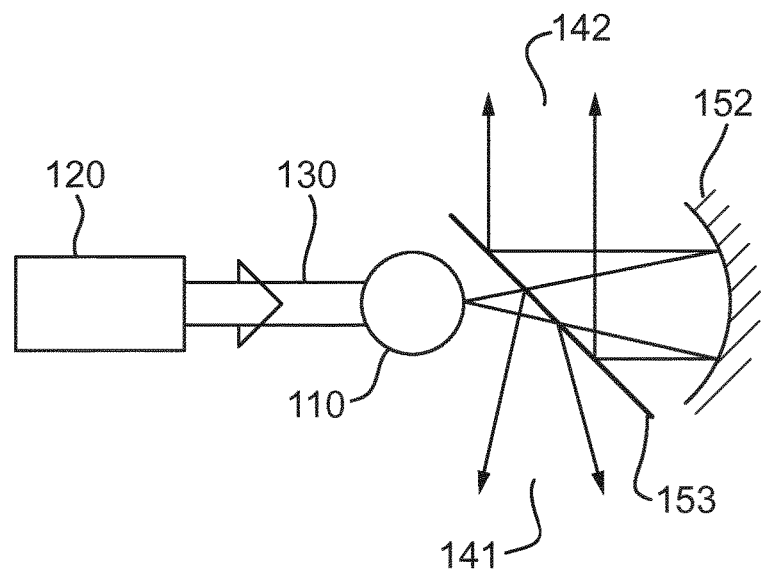
FIGS. 5A and 5B schematically illustrate further embodiments of an optical system for generating a structured optical beam according to the present invention.
Figure 5B:
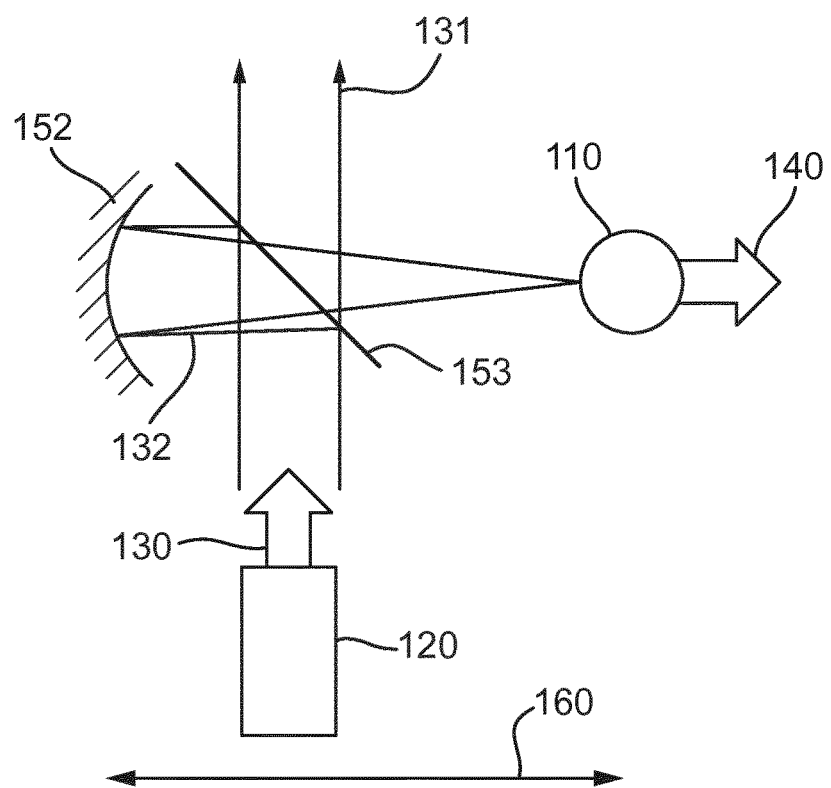

FIGS. 5A and 5B schematically illustrate further embodiments of the optical system according to the present invention. The embodiments illustrated in FIG. 5 utilise a spherical mirror 152 as the focusing element in combination with a beam splitter 153. In FIG. 5A a beam splitter 153 and spherical mirror 152 are placed consecutively after the high-index glass ball 110. In this example, the structured beam 140 emerging from the ball 110 is partially reflected by the beam splitter 153 in a first emerging and diverging structured beam 141, and partially continues through the beam splitter 153 to be reflected by the spherical mirror 152 and partially reflected by the beam splitter 153 to generate a second and focused (i.e. non-diffracting) structured beam 142. In this embodiment a spherical mirror has its focal point aligned with that of the glass ball 110 such that it has a similar effect as the focusing lens of the embodiment of FIG. 1B. Therefore the second non-diffractive beam 142 has a greatly reduced divergence and can propagate for long distances, similarly as if having gone through a focusing lens.

The spherical mirror can be replaced with a parabolic mirror or an aspherical mirror and the distance between the components can be adjusted to change the parameters for the divergence, the number of rings in the cross-sectional intensity distribution and the form of the intensity distribution itself.

FIG. 5B shows a further alternative embodiment which incorporates a beam splitter and spherical mirror 152. In the embodiment of FIG. 5B the illuminating beam 130 provided by the laser 120 is instant first on the beam splitter 153, after which part of the beam 131 passes through the beam splitter and remains a Gaussian beam. The other portion of the beam 132 is reflected onto the spherical mirror 152 which reflect and focuses the beam onto the high refractive index spherical glass ball 110. The emerging beam 140 is accordingly a structured beam 140. In this embodiment the various parameters of the structured beam, mentioned above, may be varied via changing the distance between the convex lens and the focusing element which in this case is a spherical mirror.

Figure 6A:
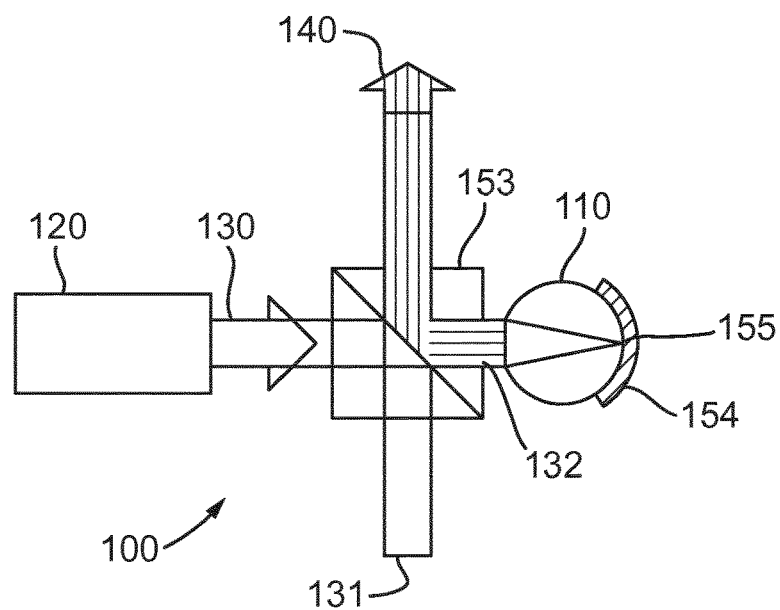
FIGS. 6A and 6B schematically illustrate further embodiments of an optical system for generating a structured optical beam according to the present invention FIGS. 7A to 7C schematically illustrate further embodiments of an optical system for generating a structured optical beam according to the present invention.
Figure 6B:
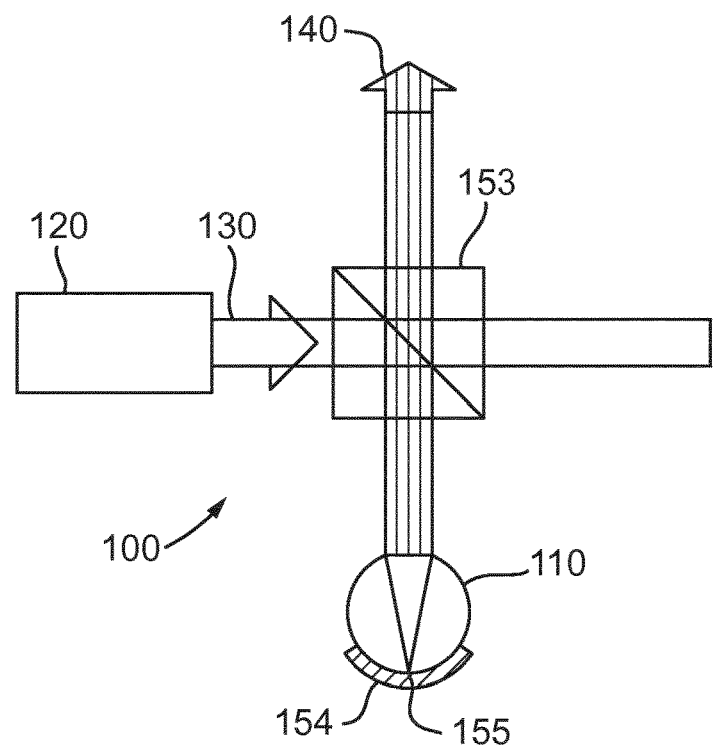

FIGS. 6A and 6B show a further variation in the optical system 100 according to the present invention. In these examples of the present invention one makes use of the fact that the high-index glass ball 110 acts as a retroreflector, reflecting a portion of the beam at the far surface 155 of the ball back through the ball toward the source. A coating or reflective layer 154 is not mandatory but can be applied to the high-index glass ball lens 110 such that the reflected portion approaches 100%. In case no coating or semi reflective coating, we can use the double path beam one side and the SB after one path on the other side. In the embodiment of FIG. 6A the laser 120 produces a Gaussian beam 130 which is incident on a beam splitter 153. One portion of the beam instant on the beam splitter 153 is reflected into an outgoing portion of the Gaussian beam 131. The other portion 132 passes through the beam splitter 153 and is refracted through the high-index glass ball 110 before being reflected by the reflective surface 154 on the back side of the high-index glass ball 110 and passing again through the ball lens 110. The reflected beam then is reflected off the beam splitter 153 to propagate out of the system as a structured beam 140. In this case, the beam does not fully traverse and exit the ball 110, but is reflected on the back surface of the ball 155, propagating back and exiting where it entered. A coating or reflected layer 154 may be applied to enhance the reflection. The effect of passing through the same ball lens 110 twice is similar to as if the beam had propagated through to consecutive high-index glass ball lenses, as shown in FIG. 4B.

The embodiment of FIG. 6B is similar to that of FIG. 6A other than it is the portion of the incident beam 131 reflected from the beam splitter 153 which is then incident on the high-index glass ball lens 110, before being reflected back off the reflective back surface 155 passing through the ball lens again, through the beam splitter 153 and emerging as a structured beam 140. The reflected layers 154 on the back surfaces 155 can be replaced by spherical mirrors in both the set-ups of FIGS. 6A and 6B. The centre of curvature of such a spherical mirror is almost common with the focal point of the high-index ball 110. As with all embodiments the properties of the emerging structured beam 140 may be varied simply by adjusting the distance between the high-index ball 110 and focusing mirror/element. Such variations in the position of the optical elements may be necessary depending on the application in which the optical system is integrated.

The glass ball lens in FIGS. 6A and 6B may equally be replaced with a cylindrical lens to provide a beam structured in one dimension.

Figure 7A:
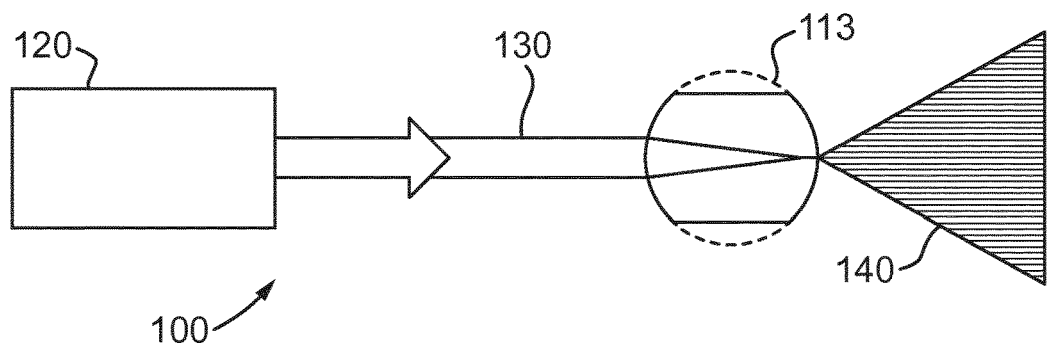

FIG. 7A illustrates a further embodiment of the optical system 100 according to the present invention. As described above, it is not necessary to illuminate the whole entry surface of the glass ball lens 110 in order to generate a structured beam 140. For a source providing substantially parallel illumination, it is only necessary to illuminate at least 20% of the entry surface to provide a high quality structured beam 140. An illumination fraction of greater than 20% is preferable, but for an illumination fraction beyond about 80% of the ball radius there is no observed improvement of the beam. Therefore, as shown in FIG. 7A, a more compact design can be obtained by using a partial glass ball lens 113. The partial glass ball lens 113 of FIG. 7A is obtained by cutting out opposing sections of a full glass ball lens 110. Such a cutaway ball lens provides a more compact form of the glass ball lens which provides a structured beam. The system of FIG. 7A produces a diverging structured beam 140 purely from the illumination of the partial glass ball lens 113. However, as with all embodiments of the invention an optical additional focusing element can be included to focus the beam along the z axis and thereby enhance the quality of the beam and the distance over which it may propagate while maintaining a highly defined intensity distribution.

Figure 7B:
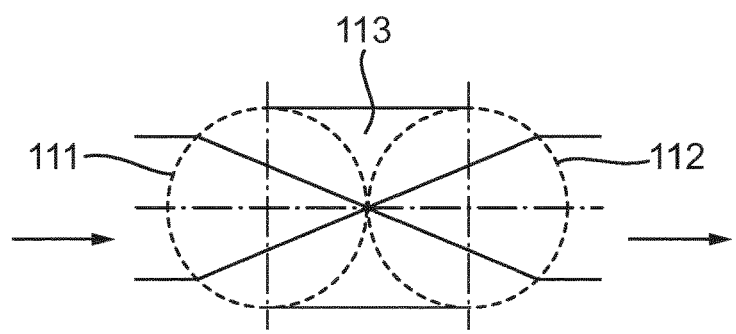
Figure 7C:
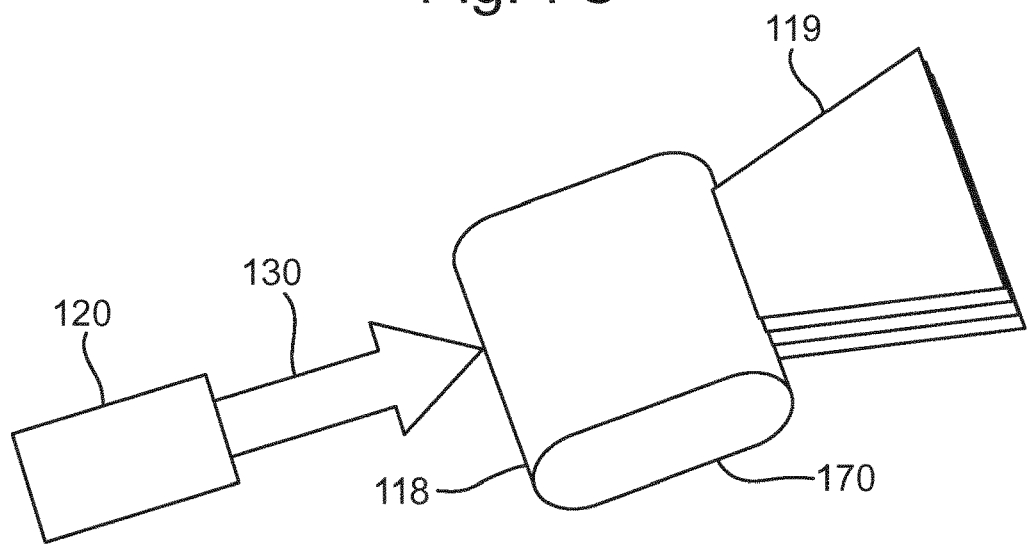
Figure 8A:
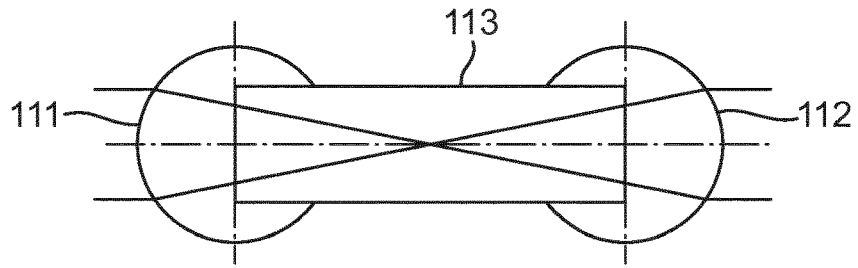
FIGS. 8A to 8D schematically illustrate possible alternatives for the convex lens that may be implemented in the optical system according to the present invention.
Figure 8B:
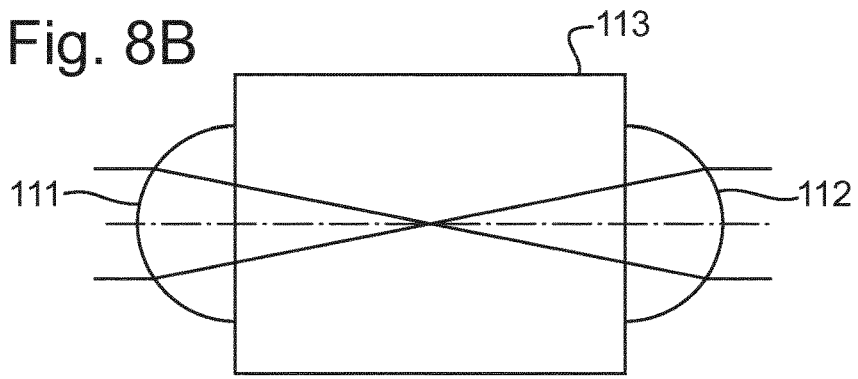
Figure 8C:
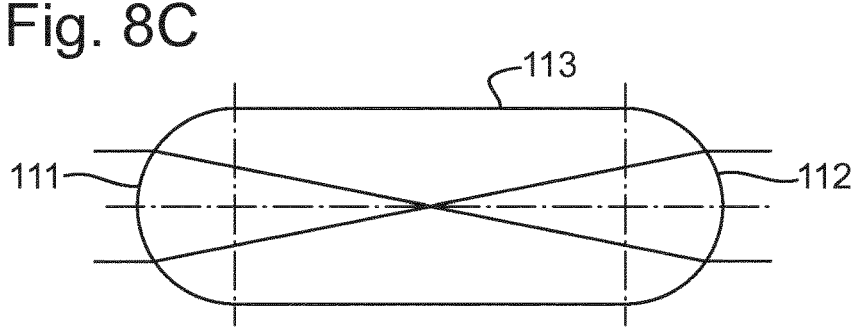
Figure 8D:
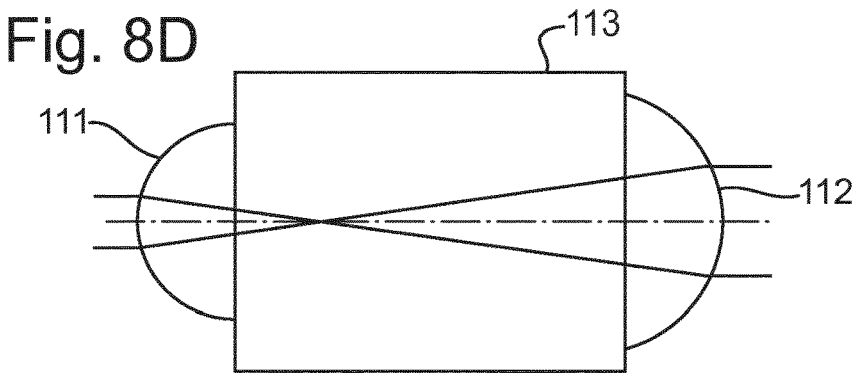

As shown in FIG. 7B, it is possible to combine the set up of two high-index glass balls 110 into a single structure; such a cross between ball(s) and cylinder can be called a "ballinder". This particular type of bi-convex thick lens is a piece of high refractive index glass having spherical entry 111 and exit 112 surfaces which need not necessarily have the same radius of curvature. In the embodiment of FIG. 7B the distance between the centres of the spherical surfaces is such that the focal point of the entry surface 111 corresponds to the focal point of the second surface 112. However the curvatures can be customised to fit special focusing needs. FIG. 7C describes the possibility to generate planar structured beam by the illumination of a compact cylindrical thick lens by a substantially coherent beam of electromagnetic radiation 130 from the electromagnetic radiation source 120, with the required sufficient illumination fraction of the cylindrical entry surface. Both cylindrical convex and focusing lenses are joined to one compact element 170 with common focal line to produce almost parallel-plane-structured beam 119. FIGS. 8A to 8D show various alternatives of bi-convex thick lenses which incorporate spherical entry and exit surfaces 111, 112 as shown in the figures, the curvature of the entry 111 and exit 112 surfaces can be varied as can the distance of high refractive index material position between them. The variation in these parameters has an effect on the position and intensity distribution of the rings and central spot produced in the cross-sectional intensity distribution of the emerging structured beam. For example in FIG. 8D the entry surface has a smaller radius of curvature in comparison to the exit surface such that the cross-over of the beam is closer to the entry surface.

Figure 9A:
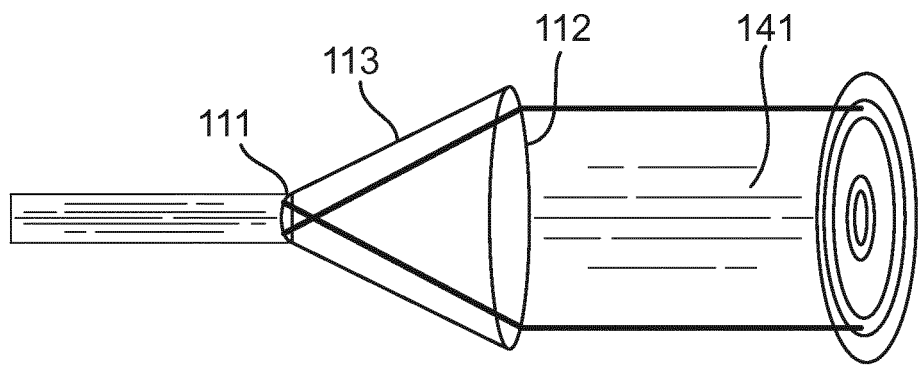
FIGS. 9A and 9B schematically illustrate possible alternatives for the convex lens that may be implemented in the optical system according to the present invention.

FIG. 9A shows a particularly preferable configuration of a high refractive index convex lens 113 in which the entrance surface has a small radius of curvature (for example 1 mm) and the outer surface has a much larger radius of curvature (for example 50 mm). In this case the bi-convex lens 113 resembles a cone. Using two surfaces where the exit surface 112 has a much larger radius of curvature than the input surface 111, acting like a beam expander, is advantageous because although the diameter of the output structured beam is larger the central beam 141 is smaller.

This arrangement can easily produce a Keplerian beam expander with high expansion ratio (diameter of output beam/diameter of input beam=focal length of the second element/focal length of the first). For high expansion ratio, the crossing waves are crossing at a wider angle and the central part is narrower. This is what results in the particular type of wavefront which is able to create the structured beam over a long distance. For example a particularly high quality structured beam can be generated with a radius of curvature of the first surface of 2 mm and a radius of curvature of the focusing surface of 20 mm.

Figure 9B:
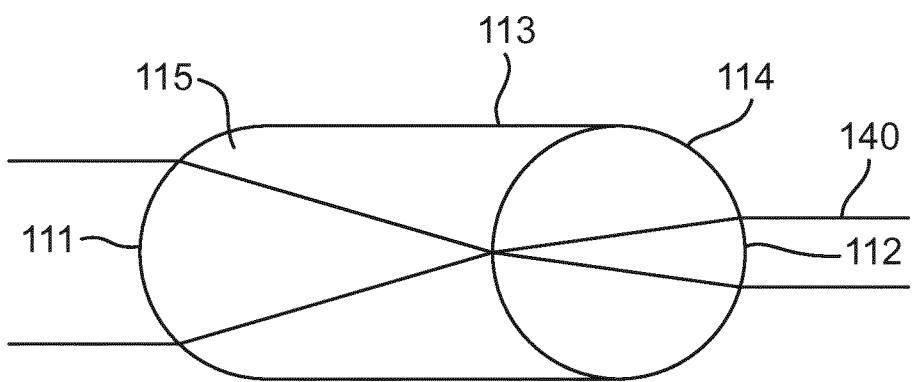

In other embodiments of the invention, such as that in FIG. 9B, a high refractive index convex lens is used which has areas of differing refractive indices. For example in FIG. 9B the portion near the exit surface 112 has a high refractive index than the portion 115 near the entry surface 111. It is also possible to manufacture such bi-convex lenses 113 having different Abbe numbers, with common spherical or aspherical surfaces and with the common focus of both surfaces chosen to produce non-diffractive optical beams up to long-distances. Variations in these parameters affect the specific intensity structure of the generated beam 140. This arrangement can eliminate chromatic aberration. One element 113 can be used for generation of structured beams in wide range of wavelengths, especially for white, short, femtosecond laser pulses.

Optimising the Beam

Although there are many ways to satisfy the minimum requirements to produce a SB, the best SBs are produced using substantially parallel (and coherent) illumination of a ball with high refractive index (close to 2.0), and a focusing lens placed after the ball lens. In addition to satisfying the minimum conditions for this set-up, the beam quality can be improved by going beyond the minimum required illumination fraction. For example, in the case of substantially parallel illumination of a convex lens where the minimum required illumination fraction is 15-20% of the ball entry surface radius of curvature, for a given refractive index close to 2. We have indicated that it is preferable to go beyond the 20% illumination; preferably above 50% and closer to 80%. As a larger area than the minimum is illuminated, more rays are refracted to contribute to the structured beam. This is true only up to a certain point (in this case 80% illumination fraction), after which additional rays no longer contribute. However, this does not mean that 80% is an upper limit—it only means that beyond 80%, additional illumination does not contribute in a meaningful way to the outgoing SB—but it does not inflict any detrimental effects, either. (There can even be some positive effects of going above this "maximum": For a Gaussian illuminating beam, the intensity profile drops exponentially. Thus, while going beyond the illumination fraction does not yield rays contributing to the output SB, it can provide a more homogenous intensity distribution over the contributing area of illumination, since the soft edge of the beam is moved further out.)

Use of the Optical System in Alignment Applications

The optical system according to the present invention can be used for the improvement of survey and alignment techniques. In particular it is applicable to any type of measurement for which lasers are used as directly with their own properties (for example for interferometry) or has a carrier (polarization modulation). Possible dimensional measurements include alignment, radial offset measurements with respect to an axis, angular alignment, relative and absolute distance measurements, 2D and 3D positioning.

In general, the optical system for producing a structured beam according to the present invention may be employed in an optical alignment system for aligning objects. Such optical alignments systems may comprise the optical system for generating a structured beam, a number of objects to be aligned each with one or more means to measure the position of the objects relative to the structured beam. The fact that the beam can propagate for large distances with a well-defined central spot means that objects may be aligned relative to the beam across large distances with high precision.

Within this general principle, there are many possible ways in which such an optical alignment system may be configured to provide high precision measurement.

Possible Arrangements of An Optical Alignment System Utilising the Structured Beam Optical alignment systems according to the present invention typically operate using the principle of detecting the position of the objects to be aligned relative to the primary structured beam, a reflected structured beam or secondary generated structured beam. Various position detection systems may be used and mounted to the objects to measure their deviation from the optical axis.

For example, the position of the objects relative to the optical axis may be measured via the analysis of the image on a position-detection device placed on the structured beam path or on a reflected structured beam path, such as a CCD or CMOS sensor or equivalent.

Alternatively measurement may be via the analysis of the signal coming from a position detector such as a position sensitive device (PSD) or equivalent, placed on the SB path or on a reflected SB path.

In other examples, the system uses the analysis of the image of the structured beam on a screen placed on the SB path or on a reflected SB path observed with a camera. The analysis may take as input: the primary SB image; the images of the primary SB and of the secondary SB created with an extra optical system such as extra lens or lenses or extra glass ball lens or lenses; or the images of the secondary SB created with an extra optical system such as extra lens or lenses or extra sphere or spheres.

Figure 10A:
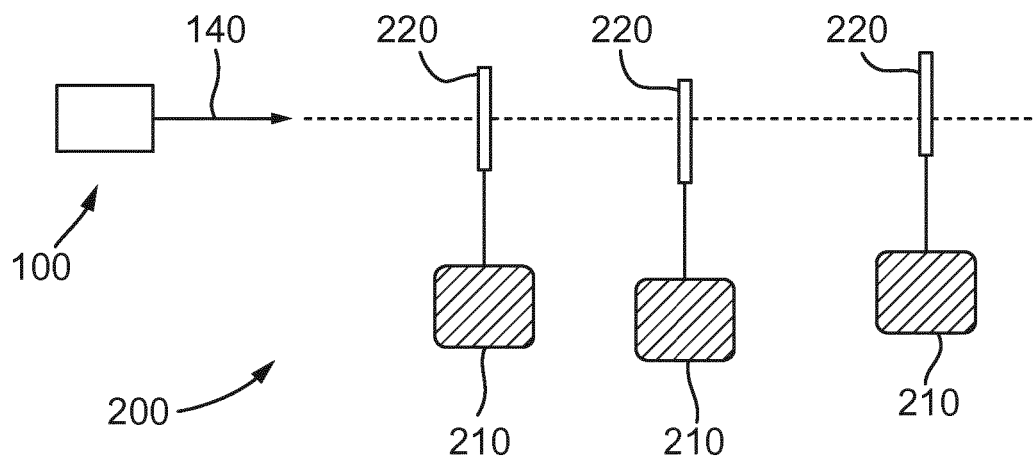
FIGS. 10A to 10G schematically illustrate embodiments of an optical alignment system incorporating the optical system for generating an optical beam according to the present invention.
Figure 10B:
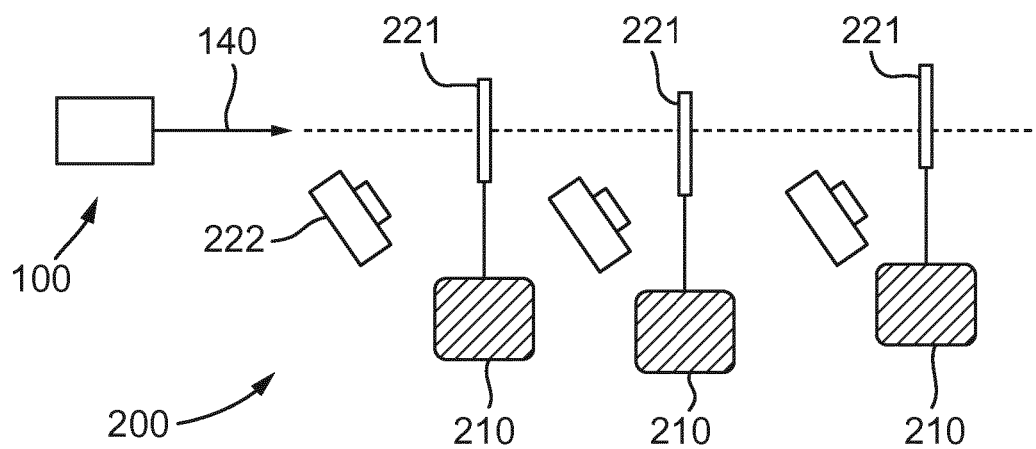
Figure 10C:
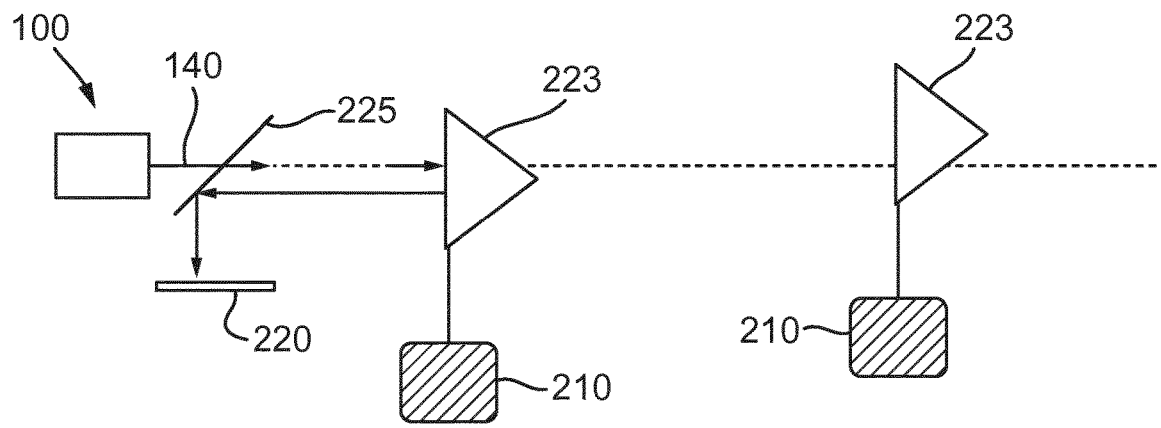
Figure 10D:
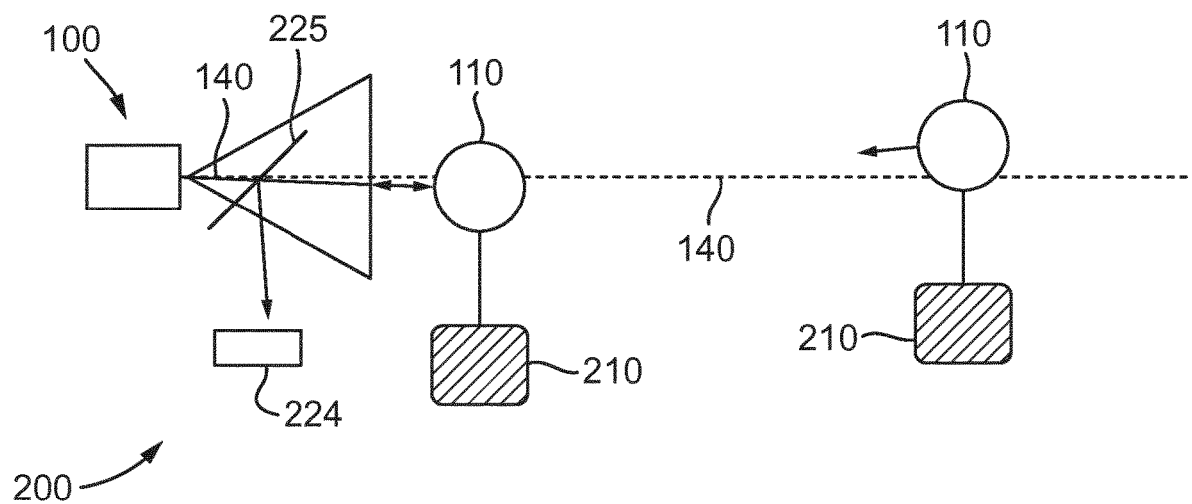
Figure 10E:
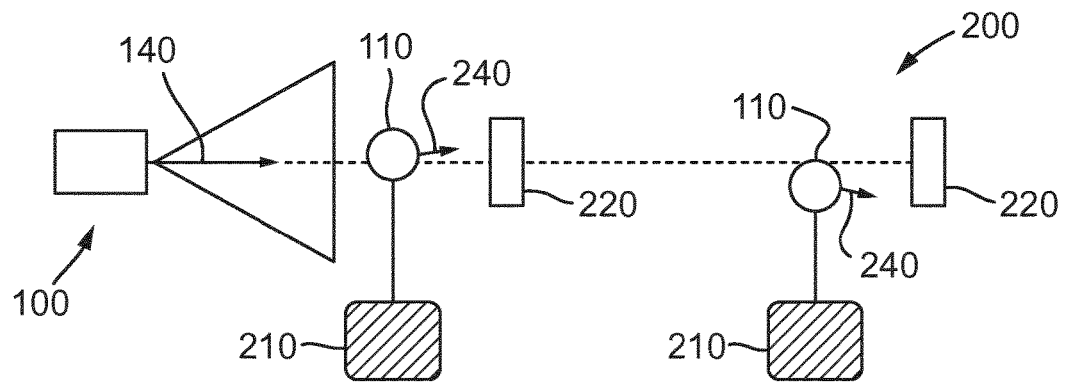
Figure 10F:
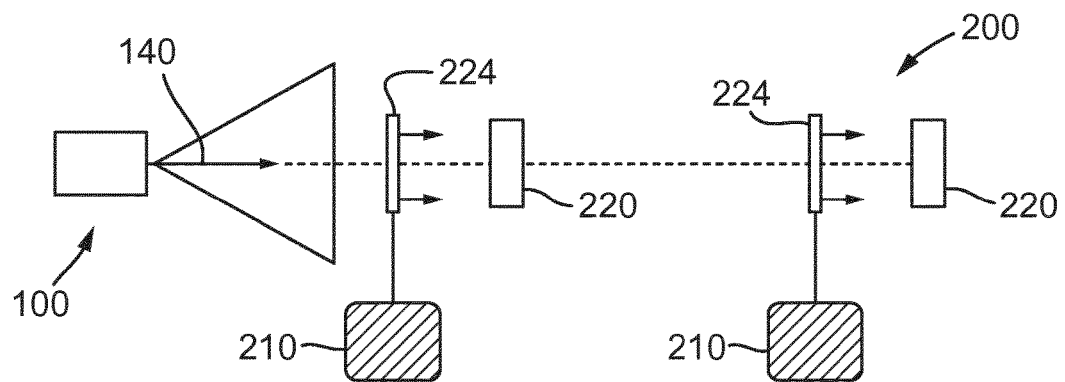
Figure 10G:
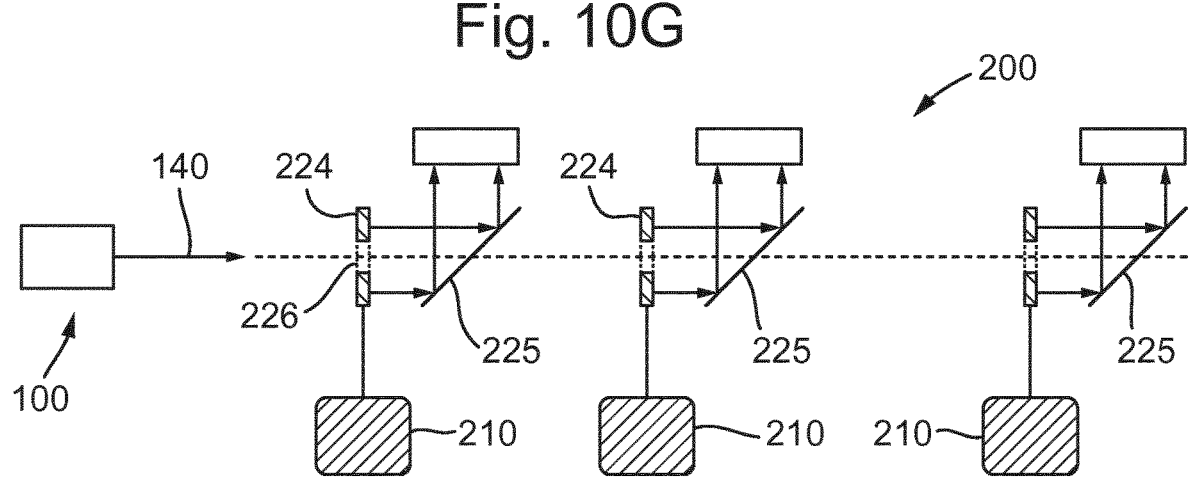
Figure 11:
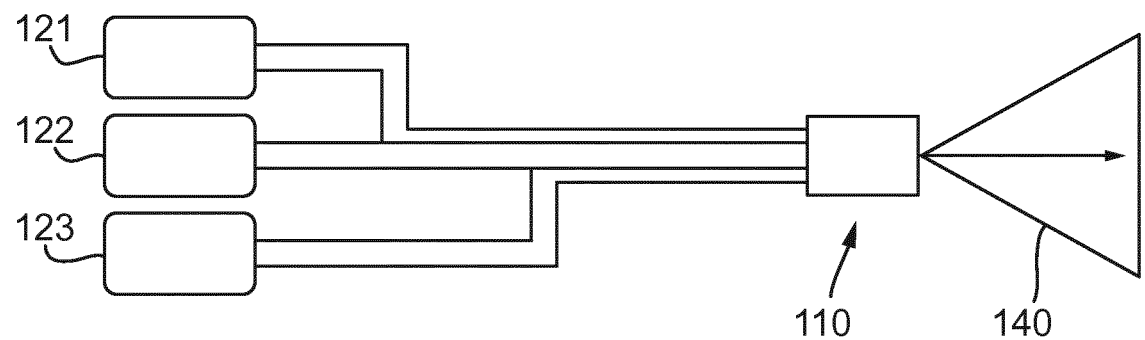
FIG. 11 schematically illustrates an embodiment of an optical system according to the present invention which provides a structured beam of mixed wavelengths.

Examples of such optical alignment systems are shown in FIGS. 10 and 11.

FIG. 10A schematically illustrates a system for aligning one or more objects according to the present invention which includes an optical system for generating a structured beam 100 and a series of objects to be aligned 210, each of which has a radial position sensor 220 attached to it. The radial position sensors can be placed on the path of the generated structured beam 140. Because the beam propagates without diverging over a long distance it can be used for a highly precise measurement of the radial position of a number of sensors 220 positioned over a long distance along the optical axis. By reading the radial position of the structured beam as it is incident on each of the radial position sensors 220, the object 210 may be aligned with very high precision.

FIG. 10B shows an alternative arrangement in which instead of attaching radial position sensors 220 to each object to be aligned 210, a screen 221 is attached to each object and positioned along the optical axis of the generated structured beam 140. In this way, the reflection of the structured beam from the screen can be read by a screen observation device 222 for each screen 221. Since the spot size of the generated structure beam 140 is very small its position on screen can be read with extremely high precision such that the objects 210 can be aligned to a high degree of accuracy.

A further embodiment of a system for alignment of multiple objects is illustrated in FIG. 10C. In this variation, the objects to be aligned 210 are attached to retro reflectors 223 which lie approximately in the path of the structured beam 140. Here the structured beam generated by the optical system 100 according to the present invention is incident on the retro reflectors positioned along the optical axis, the structured beam 140 is then reflected back where is it split at a beam splitter 160 and directed to a radial position sensor 220. Again, because the intensity distribution in the cross-section of the structured beam is highly defined and forms a very small spot size the small changes in its position due to the changing transverse position of the retro reflectors across the optical axis may be read out with high precision on the radial position sensor 220 therefore the objects 210 can be aligned with very high precision.

FIG. 10D illustrates a further example of a system for alignment of multiple objects using the optical system for generating a structured beam 100 according to the present invention. In this embodiment the full structured beam field 143 is used for alignment of the objects. In particular the rings outside the main beam of the structured beam are used for alignment. In this embodiment glass balls 110 are attached to each of the objects 210 to be aligned and these lie in the path of the structured beam field. The glass balls act as retroreflectors which reflect back the structured beam 140 from the optical system 100. A beam splitter 225 is used to reflect the beam onto a position sensor 224. Here the position sensor 224 reads the position and form of the rings and central spots of the reflected beam to accurately position each of the objects 210 relative to the optical axis of the structured beam 140.

FIG. 10E illustrates a further optical system for aligning objects according to the present invention. In this embodiment the objects to be aligned 210 are each mounted with a high refractive index glass ball 110 and are positioned adjacent to a position sensor 220. The optical system for generating a structured beam 100 is arranged to generate a structured beam, relative to which the high-index glass balls may be aligned. In particular the optical axis is defined by the structured beam 140 axis, relative to which the glass balls 110 are aligned. When the glass balls 110 are illuminated by the structured beam field they generate a secondary structured beam 240 in the direction of the arrow shown, which is then detected by the adjacent position sensor 220. Since the secondary structured beam is very narrow with a highly defined intensity distribution the offset of this beam relative to the optical axis may be measured with the position sensor 220 with high precision such that the objects may be aligned to a high degree of accuracy.

FIG. 10F schematically illustrates a further embodiment of an optical alignment system according to the present invention. This example operates in a similar way to that of FIG. 10E but uses a lens 224 to generate the secondary structured beam 240. As with the above example, the structured beam field from the primary structured beam generator 100 is incident on the secondary structured beam generator 224 with the secondary beams from each secondary beam generator 224 detected by a position sensor 220 such that any misalignment of the position sensor, and accordingly the object to be aligned, can be detected with high accuracy. The system therefore, as with that of FIG. 10E, allows a multipoint alignment system.

The optical alignment system of FIG. 10G is similar to that of FIG. 10F other than the secondary beam generators have an opening 226 allowing the primary structured beam 140 to run through the position sensing device and travel on to the further components. This therefore creates a simultaneous multipoint alignment system. In particular, the central beam passes through the gaps 226 and the further surrounding structured beam field is incident on subsequent secondary SB generators such as focusing lenses which generate further long-distance structured beams which is then partially split using a beam splitter 225 and directed to a position sensor such that the transverse offset of each position sensor relative to the beam axis may be accurately determined. The secondary SB generators at a certain position are illuminated by the portion of the primary SB which passed through the gap 226 at the previous position(s).

The systems can be installed on the beam or any other position by using, for example, retro reflective targets mounted to the objects to be aligned. These optical systems may be utilised in any application requiring a high precision alignment of system components. This is particularly true of alignment of systems in fields such as physics for example the alignment of the accelerator elements over long distances and with precision up to the micron level. It is also applicable to industry in metrology for precise alignment of rails and tables for example.

Further Applications

The SB properties make it suitable for integration in geomatics instrumentation such as theodolites, total stations, geodesy instruments and optical levels for automatic pointing and angle measurements.

Furthermore, the SB properties make it suitable for use in distance measurement based on different principles. The main principle used to measure absolute distances in geomatics domain are: difference of phase measurement using different light frequencies or modulation; scanning and tuning the circular polarization modulation frequency; and by time of flight.

The use of a coaxial multi-colour SB could be used to measure and to compensate the distance measured of the effects due to beam propagation in a non-homogenous medium such as atmosphere.

The SB properties give also the possibility to measure absolute distances using the changing intensity along the SB path, combined with interferometry. The idea is that the intensity along the beam changes periodically with distance, so that its measurement could leave information on the position along the z direction (optical axis direction). The precision can be enhanced with a multi-wavelength structured beam.

LIDAR, 3D Scanning

The main principles used in 3D scanning include:
Angle+Distance measurement
Intersection
Structure projection analysis
SB properties can be interesting for 3D scanning due to the following principles:
Narrow central spot for object pointing increases radial resolution
Distance measurement, as explained above
Intersection techniques on narrow central spots
Analysis of the SB structure projected on the object to be measured—using pattern deformation analysis by image processing.

Multi-Colour Structured Beams

FIG. 11 illustrates a further example of the optical system for producing a structured optical beam according to the present invention. In this system three sources of electromagnetic radiation 121, 122, 123 are used to illuminate the convex lens 110 and generate the structured beam 140. In particular, each source 121, 122, 123 produces electromagnetic radiation of a differing wavelength. These are then combined by using each to illuminate the convex lens such that a structured beam 140 having mixed wavelengths is generated.

This system can be realised since the structured beam, when generated by a convex lens and a focusing lens (where the focal length of focusing lens is significantly larger than focal length of convex lens), is remarkably insensitive to angular variations in the incoming beam. Varying the angle of the beam from the light source entering the ball results in a linear but much smaller change in the angle of the output structured beam. This makes it possible to create a super imposed structured beam by having different beams enter the same high-index convex lens from only slightly differing angles. It is therefore possible to create a structured beam consisting of beams of differing wavelengths. The use of the multicolour structured beam could be used to measure and to compensate the effects of the atmosphere on the straightness and fluctuations of the structured beam line. Use of a multi-coloured structured beam can also be used to measure distances and to compensate for the effects due to beam propagation in a non-homogenous medium such as the atmosphere.

Communication

The long-distance structured beam is very interesting for communication applications, especially point-to-point communication. The compactness of the central beam and the low divergence suggest data can be transmitted over longer distances than with conventional methods for point-to-point communication. Even over long distances, where the beam eventually grows too large to normally be practical, the SB may still be able to be used due to the fact that a more focused secondary beam can be obtained by placing a focusing element far down the beam (or even outside the central beam) and therefore it can be possible to use such a focusing element at the receiving end to obtain a good signal.

Other advantages of using the SB for communication applications include: the SB is more robust to atmospheric disturbances; the self-reconstructing ability means a signal can be received even with an object partially blocking the beam; and the non-Gaussian distribution of the beam can be used to obtain a higher transfer rate of data. This has been shown for other Bessel-type beams.

Optical Tweezers and Physics

The structured beam of the present invention can be used for beam tweezing (using the same principle as that carried out with an axicon, using the radial polarisation). Charged particles or ion beams acceleration can be achieved by use of longitudinal polarisation and bending by use of radial polarisation, and/or with an Airy-like beam.

Ionization Channel

The structured beam could be used as a long-distance narrow ionization channel for electric arc conduction; welding (SB-guided arc welding); and at meteo (diverting lightning). It may also be applied where an ionization channel is desirable for other reasons such as for creating a plasma channel for plasma wakefield acceleration.

Non-Electromagnetic Waves

Figure 12:
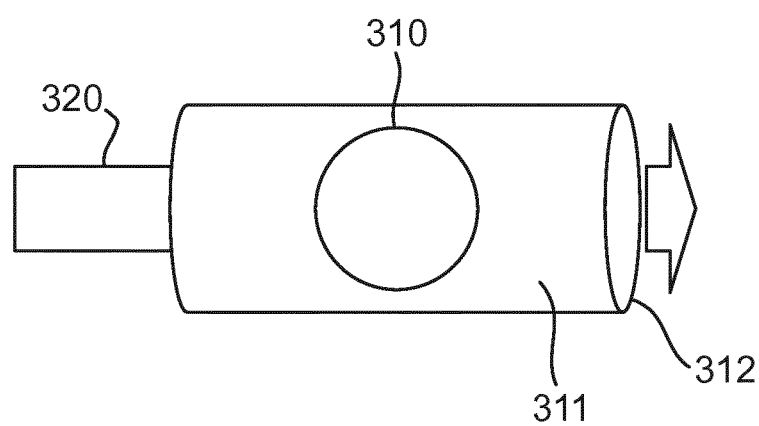
FIG. 12 schematically illustrates an example of a system in which sound waves are used to produce a structured sound wave beam.

Although the above embodiments of the present invention have been discussed with respect to electromagnetic radiation, it is possible to apply the concept to other types of beams or waves. For example, as shown in FIG. 12, it is possible to use acoustic waves and use components with corresponding properties to those described above in order to manipulate the acoustic waves in a similar fashion. For example the system in FIG. 12 uses a sound wave generator and a component 310, corresponding to the high refractive index lens of the above embodiments, within surrounding material 311 with a differing index for the required sound wavelength. The "lens" 310 may be made of a material with index N2=2X (N1) for the sound wavelength produced by the sound wave generator 320. The surrounding material may have an index N1 for the sound wave generated by the sound wave generator. An additional sound wave focusing lens 312 may be employed such that structured sound waves are produced by the system.

Method

Figure 13:
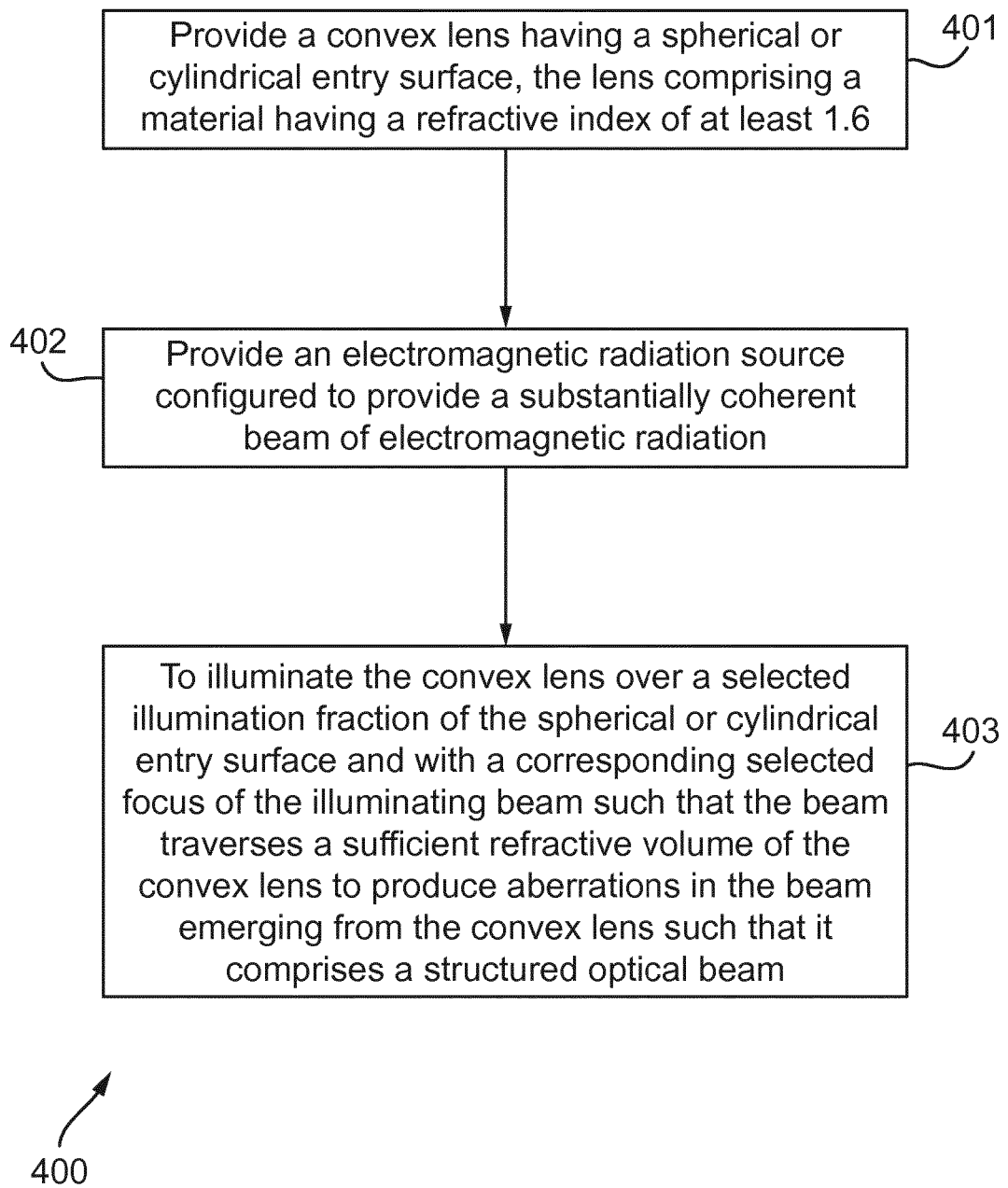
FIG. 13 illustrates a method for generating structured optical beam according to the present invention.

FIG. 13 illustrates a method for generating a structured beam according to the present invention. The method comprises the following steps:

The first step 401 comprises providing a convex lens having a spherical entry surface, the lens comprising a material having a refractive index of at least 1.6.

The second step 402 comprises providing an electromagnetic radiation source configured to provide a substantially coherent beam of electromagnetic radiation;

The third step 403 comprises arranging the source so as to illuminate the convex lens over a selected illumination fraction of the spherical entry surface and with a corresponding selected focus of the illuminating beam such that the beam traverses a sufficient refractive volume of the convex lens to produce aberrations in the emerging beam such that it comprises a structured optical beam.

Figure 14:
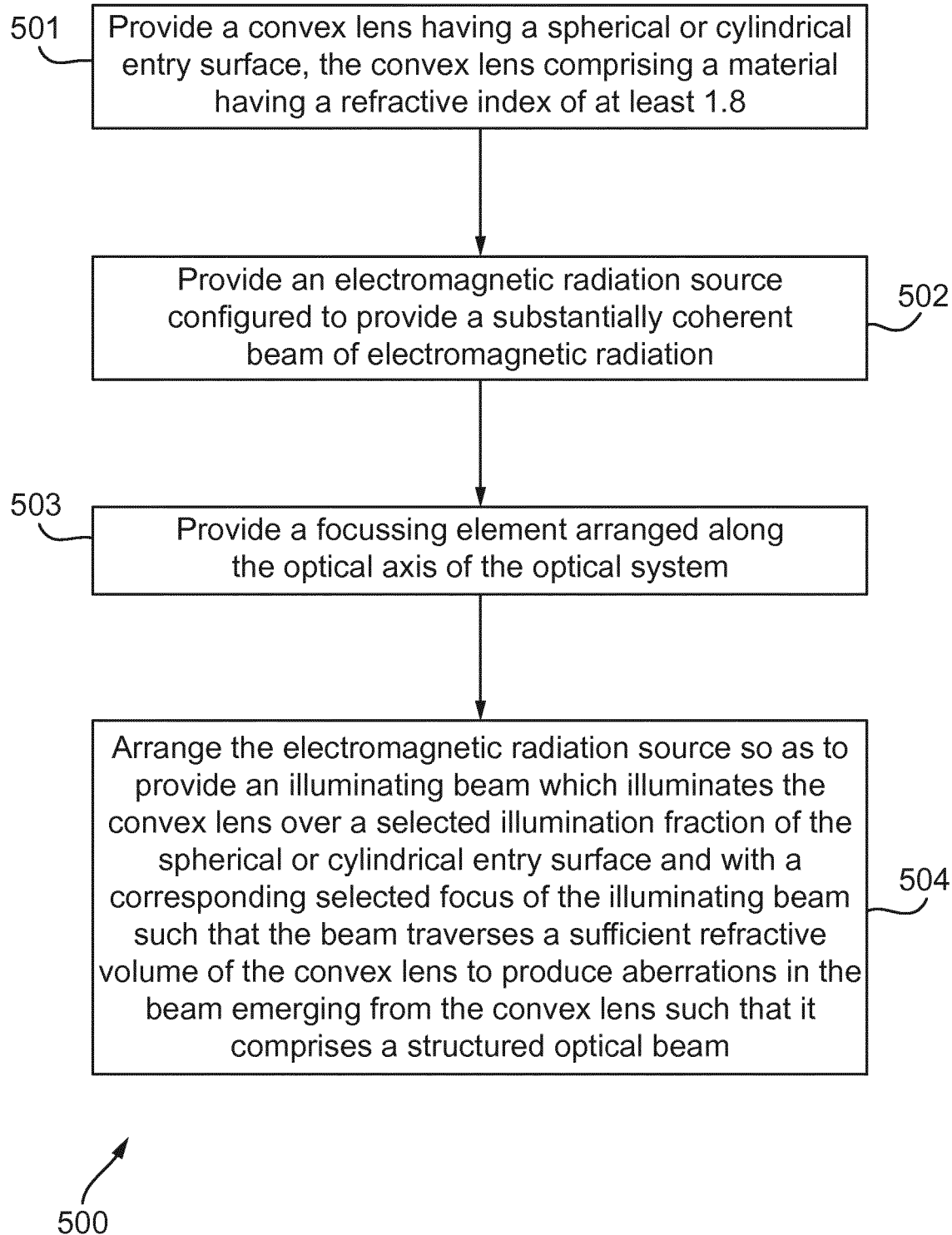
FIG. 14 illustrates a method for generating a structured beam using a focusing element according to the present invention.

FIG. 14 illustrates a method 500 for generating a structured beam according to the present invention. The method comprises the following steps:

The first step 501 comprises providing a convex lens having a spherical entry surface, the lens comprising a material having a refractive index of at least 1.6.

The second step 502 comprises providing an electromagnetic radiation source configured to provide a substantially coherent beam of electromagnetic radiation;

The third step 503 comprises providing a focussing element arranged along the optical axis of the optical system.

The fourth step 504 comprises arranging the electromagnetic radiation source so as to provide an illuminating beam which illuminates the convex lens over a selected illumination fraction of the spherical or cylindrical entry surface and with a corresponding selected focus of the illuminating beam such that the beam traverses a sufficient refractive volume of the convex lens to produce aberrations in the beam emerging from the convex lens such that it comprises a structured optical beam.

The above described examples provide a system and method for generating a structured beam which has the potential to propagate over the large distances while maintaining a well-defined cross-section intensity distribution. The systems allow a beam to produce which has a low divergence and small spot size that can be maintained over much greater distances than known systems. The system is also low cost simple to arrange and allows the parameters of the generated beam to be adjusted in a straight forward manner by varying the distance between the various components. The ability to produce a narrow well-defined highly intense beam which can propagate over large distances is particularly useful for application in alignment and measurement technologies.

The invention claimed is:

1. An optical system for producing a structured optical beam, the optical system comprising:

a convex ball lens comprising a spherical entry surface for imparting aberrations in an illuminating beam, the convex ball lens comprising a material having a refractive index of greater than 1.8;

an electromagnetic radiation source configured to provide a substantially coherent beam of electromagnetic radiation, wherein the electromagnetic radiation source is arranged to produce the illuminating beam for illuminating the convex ball lens over a selected illumination fraction of the spherical entry surface and with a corresponding selected focus of the illuminating beam, wherein the selected illumination fraction is selected, at least in part, on the corresponding selected focus of the illuminating beam and the refractive index of the material of the convex ball lens, causing the illuminating beam to traverse a sufficient refractive volume of the convex ball lens to impart aberrations in the illuminating beam emerging from the convex ball lens such that the illuminating beam comprises a structured optical beam; and a focusing element arranged along an optical axis of the optical system, wherein the aberrations imparted in the illuminating beam comprise spherical aberrations created by the convex ball lens, wherein the spherical aberrations create, at least in part, the structured optical beam.

2. The optical system of claim 1, wherein the focusing element is arranged between the electromagnetic radiation source and the convex ball lens such that the focusing element focusses the illuminating beam onto the convex ball lens to provide the selected illumination fraction of the spherical entry surface and the corresponding selected focus such that the illuminating beam traverses a sufficient refractive volume of the convex ball lens to produce the aberrations in the illuminating beam emerging from the convex ball lens resulting in formation of the structured optical beam.

3. The optical system of claim 1, wherein the convex ball lens is arranged between the electromagnetic radiation source and the focusing element such that the focusing element focusses the illuminating beam emerging from convex ball lens; and the electromagnetic radiation source is arranged to provide illumination of the convex ball lens over the selected illumination fraction of the spherical entry surface such that the illuminating beam traverses a sufficient refractive volume of the convex ball lens to produce the aberrations in the illuminating beam emerging from the convex ball lens resulting in formation of the structured optical beam when the illuminating beam emerging from the convex ball lens is focused by the focusing element.

4. The optical system of claim 3, wherein the electromagnetic radiation source is arranged to provide substantially parallel illumination of the convex ball lens with a selected illumination fraction of at least 15% of a radius of curvature of the spherical entry surface so that the illuminating beam passes substantially symmetrically through a centre of the convex ball lens.

5. The optical system of claim 1, wherein the focusing element comprises a converging lens; and the convex ball lens and the focusing element have common focal points.

6. The optical system of claim 1, wherein the convex ball lens has a spherical exit surface.

7. The optical system of claim 1, wherein a volume outside of a certain radius from the optical axis has been cut away.

8. The optical system of claim 1, wherein the convex ball lens has a refractive index of greater than 1.9.

9. The optical system of claim 1, wherein the electromagnetic radiation source is configured to provide an illuminating beam having a substantially Gaussian intensity distribution.

10. The optical system of claim wherein the focusing element comprises at least one of:
a focusing lens;
a ball lens; or
a spherical mirror.

11. The optical system of claim 10, wherein the convex ball lens is a glass ball lens and the focusing element is a converging focusing lens.

12. The optical system of claim 10, wherein the convex ball lens is a glass ball lens and the focusing element is a glass ball lens.

13. The optical system of claim 12, wherein the convex ball lens and the focusing element respectively have a refractive index of greater than 1.8.

14. The optical system of claim 12, wherein the convex ball lens and the focusing element are combined into a single integral structure.

15. The optical system of claim 10, wherein the focusing element comprises a spherical mirror and the optical system further comprises a beam splitter arranged between the convex ball lens and the spherical mirror.

16. The optical system of claim 1, wherein the convex ball lens comprises a glass ball lens and is configured such that a portion of the illuminating beam is reflected back through the convex ball lens from a rear surface of the convex ball lens, thereby forming a retroreflector by which the illuminating beam is reflected and focused.

17. The optical system of claim 16, wherein the convex ball lens is a glass ball lens and the focusing element comprises a reflective layer on a far side of the glass ball lens from the electromagnetic radiation source such that the glass ball lens forms a retroreflector, reflecting the illuminating beam back through the convex ball lens to focus the illuminating beam along the optical axis.

18. The optical system of claim 16, wherein the glass ball lens has a refractive index of greater than 1.9, preferably greater than 1.95 and preferably less than 2.05.

19. The optical system of claim 1, wherein a distance between the convex ball lens and the focusing element is adjustable to vary parameters of the structured optical beam.

20. An optical alignment system comprising:
a convex ball lens comprising a spherical entry surface for imparting aberrations in an illuminating beam, the convex ball lens comprising a material having a refractive index of greater than 1.8;

an electromagnetic radiation source configured to provide a substantially coherent beam of electromagnetic radiation, wherein the electromagnetic radiation source is arranged to produce the illuminating beam for illuminating the convex ball lens over a selected illumination fraction of the spherical entry surface and with a corresponding selected focus of the illuminating beam, wherein the selected illumination fraction is selected, at least in part, on the corresponding selected focus of the illuminating beam and the refractive index of the material of the convex ball lens, causing the illuminating beam to traverse a sufficient refractive volume of the convex ball lens to impart aberrations in the illuminating beam emerging from the convex ball lens such that the illuminating beam comprises a structured optical beam; and a focusing element arranged along an optical axis of the optical alignment system;

wherein the aberrations imparted in the illuminating beam comprise spherical aberrations created by the convex ball lens, wherein the spherical aberrations create, at least in part, the structured optical beam;

one or more objects to be aligned; and a detector for detecting a position of an object relative to the structured optical beam.

21. A method of producing a structured optical beam, the method comprising:

providing a convex ball lens having a spherical entry surface, the convex ball lens comprising a material having a refractive index of greater than 1.8;

providing an electromagnetic radiation source configured to provide a substantially coherent beam of electromagnetic radiation;

providing a focusing element arranged along an optical axis; and arranging the electromagnetic radiation source so as to provide an illuminating beam which illuminates the convex ball lens over a selected illumination fraction of the spherical entry surface and with a corresponding selected focus of the illuminating beam, wherein the selected illumination fraction is selected, at least in part, on a selected focus of the illuminating beam and the refractive index of the material of the convex ball lens, causing the illuminating beam to traverse a sufficient refractive volume of the convex ball lens to produce aberrations in the illuminating beam emerging from the convex ball lens such that the illuminating beam comprises a structured optical beam, wherein the plurality of aberrations imparted in the illuminating beam comprises spherical aberrations created by the convex ball lens, wherein the spherical aberrations create, at least in part, the structured optical beam.

* * * * *